(12) United States Patent
Myers et al.

(10) Patent No.: US 12,223,063 B2
(45) Date of Patent: Feb. 11, 2025

(54) END-TO-END MEASUREMENT, GRADING AND EVALUATION OF PRETRAINED ARTIFICIAL INTELLIGENCE MODELS VIA A GRAPHICAL USER INTERFACE (GUI) SYSTEMS AND METHODS

(71) Applicant: Citibank, N.A., New York, NY (US)

(72) Inventors: James Myers, New York, NY (US); William Franklin Cameron, Jacksonville, FL (US); Miriam Silver, Tel Aviv (IL); Prithvi Narayana Rao, Allen, TX (US); Pramod Goyal, Ahmedabad (IN); Manjit Rajaretnam, Irving, TX (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/739,111

(22) Filed: Jun. 10, 2024

(65) Prior Publication Data

US 2024/0411896 A1 Dec. 12, 2024

Related U.S. Application Data

(63) Continuation-in-part of application No. 18/607,141, filed on Mar. 15, 2024, which is a
(Continued)

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01)

(58) Field of Classification Search
CPC ............................ G06F 21/577; G06F 21/552
See application file for complete search history.

(56) References Cited

U.S. PATENT DOCUMENTS

| | | |
|---|---|---|
| 8,380,817 B2 | 2/2013 | Okada |
| 8,387,020 B1 | 2/2013 | Maclachlan et al. |
| (Continued) | | |

OTHER PUBLICATIONS

AI Risk Management Framework NIST, retrieved on Jun. 17, 2024, https://www.nist.gov/itl/ai-risk-management-framework.
(Continued)

*Primary Examiner* — Stephen T Gundry
(74) *Attorney, Agent, or Firm* — Perkins Coie LLP

(57) ABSTRACT

Systems and methods for measuring, grading, evaluating, and comparing AI models via a graphical user interface are disclosed. The technology obtains a set of application domains of the AI model in which an AI model will be used. The application domains are mapped to one or more guidelines to determine a set of guidelines that define operational boundaries of the AI model. The guidelines are used to generate assessment domains, each associated with specific benchmarks that include indicators of a degree of satisfaction with the guidelines. For each assessment domain, assessments are constructed to evaluate the AI model's degree of satisfaction with the corresponding guidelines. The AI model is then evaluated against the assessments. Based on these comparisons, grades are assigned to the AI model for each assessment domain. The application-domain-specific grades are generated and displayed at a GUI, reflecting the AI model's degree of satisfaction with the guidelines.

20 Claims, 9 Drawing Sheets

Related U.S. Application Data continuation-in-part of application No. 18/399,422, filed on Dec. 28, 2023, which is a continuation of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491.

(56) References Cited

U.S. PATENT DOCUMENTS

| | | | |
|---|---|---|---|
| 10,620,988 | B2 | 4/2020 | Lauderdale et al. |
| 11,133,942 | B1 | 9/2021 | Griffin |
| 11,410,136 | B2 | 8/2022 | Cook et al. |
| 11,470,106 | B1* | 10/2022 | Lin ................ H04L 63/1433 |
| 11,503,075 | B1* | 11/2022 | Sirianni ............ H04L 63/1416 |
| 11,652,839 | B1* | 5/2023 | Aloisio ............ H04L 63/1433 726/25 |
| 11,681,811 | B1* | 6/2023 | Dixit ...................... G06F 8/65 726/25 |
| 11,683,333 | B1* | 6/2023 | Dominessy ........ H04L 43/045 726/25 |
| 11,706,241 | B1 | 7/2023 | Cross et al. |
| 11,720,686 | B1 | 8/2023 | Cross et al. |
| 11,734,418 | B1 | 8/2023 | Epstein |
| 2003/0007178 | A1 | 1/2003 | Jeyachandran et al. |
| 2004/0098454 | A1 | 5/2004 | Trapp et al. |
| 2005/0204348 | A1 | 9/2005 | Horning et al. |
| 2006/0095918 | A1 | 5/2006 | Hirose |
| 2007/0067848 | A1 | 3/2007 | Gustave et al. |
| 2010/0275263 | A1 | 10/2010 | Bennett et al. |
| 2010/0313189 | A1 | 12/2010 | Beretta et al. |
| 2014/0137257 | A1 | 5/2014 | Martinez et al. |
| 2014/0258998 | A1 | 9/2014 | Adl-Tabatabai et al. |
| 2017/0061132 | A1 | 3/2017 | Hovor et al. |
| 2017/0295197 | A1 | 10/2017 | Parimi et al. |
| 2018/0239903 | A1 | 8/2018 | Bodin et al. |
| 2018/0343114 | A1 | 11/2018 | Ben-ari |
| 2019/0188706 | A1 | 6/2019 | Mccurtis |
| 2019/0236661 | A1 | 8/2019 | Hogg et al. |
| 2019/0286816 | A1 | 9/2019 | Fu |
| 2020/0012493 | A1 | 1/2020 | Sagy |
| 2020/0043164 | A1 | 2/2020 | Fuchs et al. |
| 2020/0074470 | A1 | 3/2020 | Deshpande et al. |
| 2020/0153855 | A1 | 5/2020 | Kirti et al. |
| 2020/0259852 | A1 | 8/2020 | Wolff et al. |
| 2020/0309767 | A1 | 10/2020 | Loo et al. |
| 2020/0314191 | A1 | 10/2020 | Madhavan et al. |
| 2020/0334326 | A1 | 10/2020 | Zhang et al. |
| 2020/0349054 | A1 | 11/2020 | Dai et al. |
| 2021/0012486 | A1 | 1/2021 | Huang et al. |
| 2021/0049288 | A1 | 2/2021 | Li |
| 2021/0133182 | A1 | 5/2021 | Anderson et al. |
| 2021/0185094 | A1 | 6/2021 | Waplington et al. |
| 2021/0211431 | A1 | 7/2021 | Albero et al. |
| 2021/0264547 | A1 | 8/2021 | Li |
| 2021/0273957 | A1 | 9/2021 | Boyer et al. |
| 2021/0390465 | A1 | 12/2021 | Werder et al. |
| 2022/0114251 | A1 | 4/2022 | Guim Bernat et al. |
| 2022/0147636 | A1 | 5/2022 | Mahuli et al. |
| 2022/0198304 | A1* | 6/2022 | Szczepanik ............ H04L 63/12 |
| 2022/0286438 | A1 | 9/2022 | Burke et al. |
| 2022/0303302 | A1* | 9/2022 | Hwang ................ G06N 5/04 |
| 2022/0327620 | A1* | 10/2022 | Ndoutoumou ......... G06Q 40/04 |
| 2022/0334818 | A1 | 10/2022 | Mcfarland |
| 2022/0342846 | A1* | 10/2022 | Kunchakarra ...... G06F 11/3688 |
| 2022/0345457 | A1* | 10/2022 | Jeffords ............ G06F 21/6218 |
| 2022/0368728 | A1* | 11/2022 | Murray ............ H04L 63/0414 |
| 2022/0377093 | A1* | 11/2022 | Crabtree ............ H04L 43/045 |
| 2022/0398149 | A1 | 12/2022 | Mcfarland et al. |
| 2022/0400135 | A1* | 12/2022 | Gamra ................ H04L 63/20 |
| 2022/0414213 | A1* | 12/2022 | Dixit .................. G06F 21/554 |
| 2022/0417274 | A1 | 12/2022 | Madanahalli et al. |
| 2023/0007039 | A1* | 1/2023 | Waplington ............. G06N 5/04 |
| 2023/0019072 | A1* | 1/2023 | Okunlola ............. G06N 20/00 |
| 2023/0032686 | A1 | 2/2023 | Williams et al. |
| 2023/0033317 | A1* | 2/2023 | Lin .................... H04L 63/1433 |
| 2023/0035321 | A1 | 2/2023 | Vijayaraghavan |
| 2023/0039855 | A1* | 2/2023 | Greene, Jr. ............. H04L 43/08 |
| 2023/0052608 | A1 | 2/2023 | Wattiau et al. |
| 2023/0067128 | A1 | 3/2023 | Engelberg et al. |
| 2023/0071264 | A1 | 3/2023 | Hakala et al. |
| 2023/0076372 | A1 | 3/2023 | Engelberg et al. |
| 2023/0077527 | A1 | 3/2023 | Sarkar |
| 2023/0113621 | A1* | 4/2023 | Griffin .................. H04L 63/145 726/23 |
| 2023/0114719 | A1 | 4/2023 | Thomas et al. |
| 2023/0117962 | A1 | 4/2023 | Kaimal et al. |
| 2023/0118388 | A1 | 4/2023 | Crabtree et al. |
| 2023/0123314 | A1 | 4/2023 | Crabtree et al. |
| 2023/0132703 | A1 | 5/2023 | Marsenic et al. |
| 2023/0135660 | A1 | 5/2023 | Chapman et al. |
| 2023/0164158 | A1* | 5/2023 | Fellows .............. H04L 63/1441 726/23 |
| 2023/0171282 | A1* | 6/2023 | Bollinger, III ........ H04L 63/102 726/25 |
| 2023/0177613 | A1* | 6/2023 | Crabtree ................ G06N 5/045 705/36 R |
| 2023/0205888 | A1 | 6/2023 | Tyagi et al. |
| 2023/0205891 | A1 | 6/2023 | Yellapragada et al. |
| 2023/0208869 | A1 | 6/2023 | Bisht et al. |
| 2023/0208870 | A1 | 6/2023 | Yellapragada et al. |
| 2023/0208871 | A1 | 6/2023 | Yellapragada et al. |
| 2023/0229542 | A1 | 7/2023 | Watkins et al. |
| 2023/0259860 | A1 | 8/2023 | Sarkar |
| 2023/0269272 | A1 | 8/2023 | Dambrot et al. |

OTHER PUBLICATIONS

Independent analysis of AI language models and API providers. Artificial Analysis, retrieved on Jun. 13, 2024, https://artificialanalysis.ai/, 11 pages.
Brown, D., et al., "The Great AI Challenge: We Test Five Top Bots on Useful, Everyday Skills," The Wall Street Journal, published May 25, 2024.
Dong, Y., et al., "Building Guardrails for Large Language Models," https://ar5iv.labs.arxiv.org/html/2402.01822v1, published May 29, 2024, 20 pages.
International Search Report and Written Opinion Received received in Application No. PCT/US23/85942, dated Feb. 15, 2024, 6 pages.
Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.
Mavrepis, P., et al., "XAI for All: Can Large Language Models Simplify Explainable AI?," https://arxiv.org/abs/2401.13110, Jan. 23, 2024, 10 pages.
Mollick, E., "Latent Expertise: Everyone is in R&D," One Useful Thing, published on Jun. 20, 2024, https://www.oneusefulthing.org/p/latent-expertise-everyone-is-in-r.
Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.
Zhao, H., et al., "Explainability for Large Language Models: A Survey," https://arxiv.org/abs/2309.01029, Nov. 28, 2024, 38 pages.
Aggarwal, Nitin , "Why measuring your new AI is essential to its succes", KPIs for gen AI: Why measuring your new AI is essential to its succes, 7 pages.
AI , "What is AI Verify?", What is AI Verify—AI Verify Foundation.
Altman, Sam , "Sam Altman Admits That OpenAI Doesn't Actually Understand How Its AI Works", Sam Altman Admits That OpenAI Doesn't Actually Understand How Its AI Works—"We certainly have not solved interpretability.", 4 pages.
Anthrop/C , "Mapping the Mind of a Large Language Model", Mapping the Mind of a Large Language Model, May 21, 2024.

(56) References Cited

OTHER PUBLICATIONS

Claburn, Thomas, "OpenAI's GPT-4 can exploit real vulnerabilities by reading security advisories", OpenAI's GPT-4 can exploit real vulnerabilities by reading security advisories, Apr. 17, 2024, 3 pages.

Marshall, Andrew, "Threat Modeling AI/ML Systems and Dependencies", Threat Modeling AI/ML Systems and Dependencies, Nov. 2, 2022, 27 pages.

Roose, Kevin, "A.I. Has a Measurement Problem", A.I. Has a Measurement Problem, Apr. 15, 2024, 5 pages.

Roose, Kevin, "A.I.'s Black Boxes Just Got a Little Less Mysterious", A.I.'s Black Boxes Just Got a Little Less Mysterious, May 21, 2024, 5 pages.

Shah, Harshay, "Decomposing and Editing Predictions by Modeling Model Computation", Decomposing and Editing Predictions by Modeling Model Computation, 5 pages.

Shankar, Ram, "Failure Modes in Machine Learning", , Nov. 2019, 14 pages.

Teo, Josephine, "Singapore launches Project Moonshot", Singapore launches Project Moonshot—a generative Artificial Intelligence testing toolkit to address LLM safety and security challenges, May 31, 2024, 8 pages.

Empower Your Team with a Compliance Co-Pilot, Sedric, retrieved on Sep. 25, 2024. https://www.sedric.ai/.

Cranium, Adopt & Accelerate AI Safely, retrieved on Nov. 7, 2024, from https://cranium.ai/.

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Mathews, A. W., "What AI Can Do in Healthcare—and What It Should Never Do," The Wall Street Journal, published on Aug. 21, 2024, retrieved on Sep. 5, 2024. https:/www.wsj.com.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

\* cited by examiner

END-TO-END MEASUREMENT, GRADING AND EVALUATION OF PRETRAINED ARTIFICIAL INTELLIGENCE MODELS VIA A GRAPHICAL USER INTERFACE (GUI) SYSTEMS AND METHODS

CROSS-REFERENCE TO RELATED APPLICATION(S)

This application is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" filed on Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023. The content of the foregoing applications are incorporated herein by reference in its entirety.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. AI models provide a more dynamic and nuanced approach to security by continuously analyzing vast amounts of data to identify patterns and provide predictions based on the analyzed data. However, there is a lack of a grading system for the AI model. In particular, there is a lack of a grading system that addresses multiple operational domains (e.g., dimensions, assessment domains, test categories, attributes) when evaluating a pretrained AI model. Without a grading system that evaluates multiple operational domains of an AI model, there exists a risk of inconsistency in evaluating AI models, which leads to ambiguity in assessing the AI models' reliability, performance, and/or compliance with regulatory frameworks. The lack of a grading system that addresses multiple operational domains of AI model performance additionally prevents users from comparing different AI models under a common (e.g., standard, unified) benchmark that indicates a degree of satisfaction of each AI model with the guidelines. Moreover, in the absence of multi-factor grading system, users face challenges in making informed decisions about deploying, updating, or retiring AI models, which raises concerns about the AI model's reliability and trustworthiness and results in potential risks to safety, security, and ethical considerations.

Figure 1:
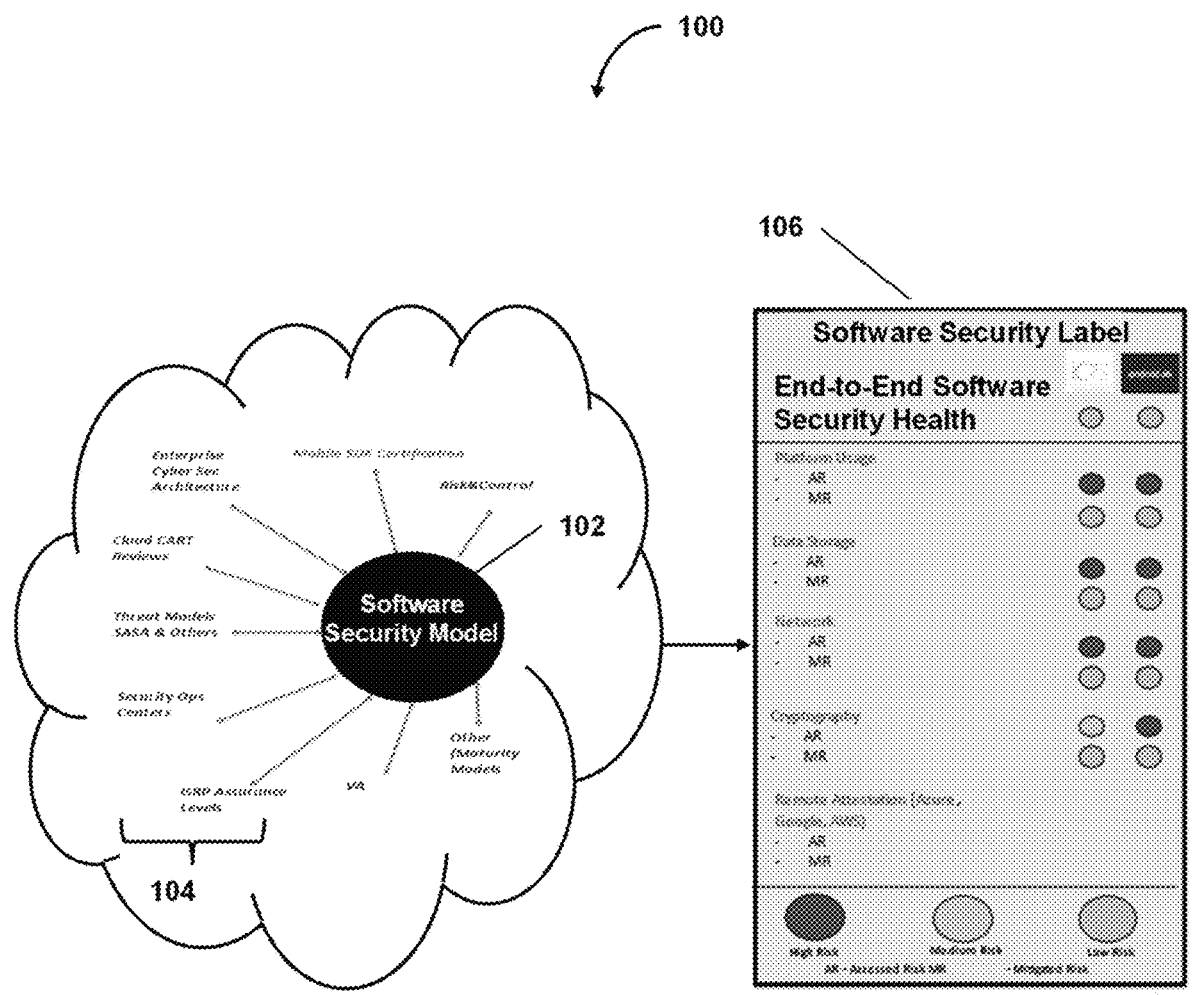
FIG. 1 is an illustrative diagram showing an illustration of a logical component used to determine platform-specific end-to-end security vulnerabilities for a software application and a graphical layout for displaying the platform-specific end-to-end security vulnerabilities for the software application via a Graphical User Interface (GUI), in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

AI applications offer a powerful framework for extracting insights and making predictions from data. One of the key advantages of AI applications lies in an AI model's ability to automatically identify patterns and relationships within complex datasets, even in the absence of explicit programming. The capability enables AI applications to uncover relationships, predict future outcomes, and drive data-driven decision-making across various fields. However, as AI becomes increasingly integrated into critical systems and decision-making processes, the need for reliable and transparent assessments of AI performance and compliance becomes increasingly important. The rapid deployment and integration of LLMs have raised significant concerns regarding their risks including, but not limited to, ethical use, data biases, privacy and robustness. Without a grading system that addresses multiple aspects of AI model performance with corresponding benchmarks, evaluating the efficacy, reliability, ethical implications, and other dimensions of AI applications becomes challenging. Traditional approaches to using AI models, for example, to secure computing platforms typically involve users providing an input (e.g., a command set or prompt) and receiving output predictions. However, users are unable to evaluate the AI model since the inner workings of the AI model, including the algorithms and decision-making processes employed, remain opaque to the user. From the user's perspective, the AI model functions as a "black box," where the input is fed into the system, and the output prediction is produced without visibility into the underlying logic. Once the input data is processed by the AI model, users receive output predictions (e.g., in a cybersecurity context, an AI model could indicate whether each access attempt is deemed authorized or unauthorized). These predictions can inform security decisions and actions taken by users or automated systems. Since the AI model is a "black box," attempts to prevent unwanted AI model outputs include filtering out potentially risky inputs using pre-defined rulesets, rather than addressing the root cause of the problem (e.g., being unable to evaluate the AI model). Without a comprehensive evaluation of the AI model to understand how the model processes information and generates outputs, simply filtering inputs through pre-defined rules is a superficial measure that can easily be circumvented or fail to catch unforeseen risky inputs. Moreover, this approach does not improve the model's underlying reliability or transparency.

For example, a common issue faced by engineers due to the lack of visibility into AI algorithm logic is the inability to validate the accuracy and effectiveness of the AI model's outputs. Security professionals, as an example, require confidence in the methodologies used by AI models to make informed decisions about platform security. Without a clear understanding of the underlying logic, engineers may be hesitant to trust the outputs of AI models. Moreover, the lack of transparency into AI algorithm logic hinders efforts to diagnose and address issues within the AI model effectively. Additionally, the lack of visibility into AI algorithm logic can exacerbate concerns about adherence to regulations or guidelines. If engineers cannot discern how AI models weigh different factors or make decisions, it becomes difficult to ensure that the algorithms adhere to the regulations or guidelines. The opacity may lead to unintended consequences, such as disproportionate impacts on certain user groups or overlooking security vulnerabilities.

Attempts to evaluate an AI model only include rudimentary evaluations and assessments for a singular dimension (e.g., only evaluating data quality, accuracy, or security vulnerabilities) of the AI model. A single-dimensional assessment leads to ambiguity in assessing the AI models' reliability, performance, and/or compliance with regulatory frameworks. Different organizations or individuals may employ varied criteria or methodologies for assessing AI performance in particular assessment domains, leading to disparate outcomes and interpretations when attempting to determine a unified score indicating the performance of an AI model across multiple assessment domains. There is a lack of a testing method (e.g., evaluation system, grading system) that evaluates multiple operational domains (e.g., dimensions, assessment domains, test categories, attributes) including operational domains such as security vulnerabilities, of a pre-trained artificial intelligence (AI) model.

Evaluating an AI model in a singular assessment domain can lead to an incomplete understanding of the AI model's overall performance. AI models operate in complex environments where various factors, such as data quality, computational efficiency, and ethical considerations, all may affect the usefulness of the AI model. An assessment (e.g., test) that only assesses one dimension, such as only accuracy, may fail to capture the model's behavior in different contexts, and potentially overlook issues such as bias, robustness, and/or adaptability. Without multi-dimensional evaluation that assesses multiple assessment domains of the AI model, vulnerabilities or weaknesses in one assessment domain may propagate across interconnected systems, which leads to widespread disruptions.

Further, single-domain assessments can create a false sense of security. For instance, an AI model may score high on accuracy metrics but could still have vulnerabilities in security or ethical dimensions. Without a multi-dimensional evaluation, the issues within the AI model remain undetected, which presents risks when the AI model is deployed. A common issue faced by network engineers due to the lack of a multi-dimensional evaluation is the undermined trust in AI technologies, particularly in sectors where security and privacy of personal identifying information (PII) are important, such as healthcare, finance, and government. Without assurance that AI applications satisfy regulatory standards and/or best practices, users may hesitate to entrust sensitive data or critical operations to AI applications. The lack of trust prevents the adoption of AI technologies in these sectors, which additionally prevents the realization of the potential benefits of AI in enhancing security and efficiency in the sectors.

Additionally, users are unable to benchmark AI models against each other or established standards/guidelines, making it challenging to determine if best practices are being followed by the AI model, and identify areas for improvement in the AI model. The lack of consistency not only complicates decision-making processes (e.g., determining which AI model is more well-suited for an organization) but also undermines the reliability and credibility of AI assessments performed. For example, security standards and best practices safeguard AI systems against malicious attacks, data breaches, and unauthorized access. However, without a multi-dimensional evaluation that can use standardized benchmarks that indicate a degree of satisfaction of the AI model with the guidelines, developers may overlook security considerations or employ ad-hoc measures that fail to adequately protect against emerging threats. The inconsistency in evaluations increases the likelihood of AI systems being exploited by malicious actors, leading to breaches of sensitive data, financial losses, and reputational damage for organizations deploying these AI applications.

Similarly to the complexities in evaluating AI models, cybersecurity applications offer similar challenges. Given the complexity of differing security vulnerability threat vectors included in security vulnerability descriptions, end-users of software applications are often unable to determine whether a particular software application is secure or otherwise safe to use. In addition to the complex information of these cyber security threats, end-users, as well as software development teams are often unaware of how these threat vectors may impact specific aspects (e.g., data storage, cryptographic communications, networking, etc.) of the software they are developing with respect to the specific platform. There is a need for determining, with respect to a given platform and the software being executed on the platform, how specific computing aspects (e.g., assessment domains) are impacted by a particular security vulnerability (or threat vector). Moreover, there is a need to predict which computing aspects are impacted by security vulnerabilities in real-time (or near real-time) to enable end-users to make informed decisions as to whether a software application the user intends to use is safe when new security vulnerabilities are discovered. Existing systems may provide generic security vulnerability-related information to software development teams, however, without determining how the generic security vulnerabilities impact different aspects of a specific platform with respect to the software application, the generic nature of the security vulnerability information is of minimal, if any, value and impact.

To overcome these and other deficiencies of existing systems, the inventors have developed an improved method and system for grading Artificial Intelligence (AI) models across multiple assessment domains. The method involves assessing the performance, reliability, and compliance of AI models across various operational contexts by obtaining a set of application domains of the AI model in which an AI model will be used. The application domains are mapped to a set of guidelines that define the operation boundaries of the AI model. The guidelines are used to generate a set of assessment domains (e.g., test categories) for evaluation, such as data quality, software development practices, regulatory compliance, and cybersecurity measures. Each guideline can be associated with one or more assessment domains, and each assessment domain includes a set of benchmarks to indicate the degree of satisfaction of the AI model with the corresponding guidelines. For each assessment domain, the method constructs a set of assessments, which can include a prompt and an expected response. The assessments are designed to assess the AI model's degree of satisfaction with the guidelines associated with the corresponding assessment domain. For example, the prompts can serve as inputs to the AI model, while the expected responses represent the desired outcomes based on the guidelines.

The AI model is evaluated against the set of assessments for each assessment domain. For example, if the AI model is a large language model (LLM), the evaluation process can include supplying the prompts of the assessments into the AI model and receiving case-specific responses. The case-specific responses are compared to the expected responses of the assessments to determine the degree of satisfaction of the AI model with the guidelines. Based on these comparisons, grades are assigned to the AI model for each assessment domain in accordance with the set of benchmarks. The grading process can include binary indicators, categorical grades, or probability scores, depending on the specific criteria and performance thresholds defined by the benchmarks. Using the evaluation results, a set of application-domain-specific grades (e.g., overall grades) are generated for the AI model, indicating the model's degree of satisfaction with the set of guidelines.

For example, assessment domains can focus on security aspects (e.g., data encryption, access controls, vulnerability management, threat detection), data quality (e.g., bias), AI explainability, software development, and/or regulatory compliance. Specific assessments can be generated within each category to evaluate the AI model's performance. For example, an assessment within the threat detection assessment domain may prompt the AI model to analyze simulated cyberattack scenarios and identify potential security breaches. The expected response for this assessment would be the accurate detection and classification of malicious activities, which would align with the assessment domain's benchmarks for effective threat detection. If the AI model successfully detects and mitigates simulated cyber threats in line with the established guidelines, the AI model receives a high degree of satisfaction with the cybersecurity standards. Conversely, if the model fails to adequately address security vulnerabilities or detect intrusions, the AI model may receive a lower degree of satisfaction indicating areas for improvement. The AI model can be compared with other AI models that are evaluated using the common benchmarks across multiple assessment domains. Traditional approaches to evaluating the AI model's performance may lead to the software developer and/or end-user to misinterpret or simply miss any identified (and even unknown) security vulnerabilities or other gaps with respect to the AI model due to the lack of transparency of the AI model's decision-making logic. Thus, by creating a standardized process of measuring, grading, and evaluating the AI model across multiple identified application domains and assessment categories, the system improves an end-user's understanding of the security (and other aspects) of an AI model they intend to use.

In some implementations, the method uses machine learning (ML) models to automate the determination of relevant guidelines based on factors such as the location of the AI model, the AI model's use case, and the data sources used. The automated approach improves the efficiency, consistency, and accuracy in selecting relevant assessment domains, ensuring that evaluations are tailored to the specific context and requirements of each AI application. In some implementations, the method creates multiple sets of assessments for each assessment domain, where each set of assessments are calibrated to equally evaluate the AI model, to introduce variability and unpredictability into the evaluation process to prevent AI models from overfitting specific assessments.

In various implementations, the methods and systems described herein can generate an improved graphical layout indicating application-domain-specific grades (e.g., as related to an application domain of the AI model) to indicate to an end-user the results of the evaluation of the AI model. For example, obtained guidelines can be used to identify a set of assessment domains associated with an AI model and the application domain of the AI model. A set of assessments related to the assessment domain is then accessed to determine a grade for each assessment domain by using corresponding benchmarks that indicate information related to the operation boundaries of the AI model. Application-domain-specific grades for each application domain associated with the AI model can be determined using the assigned grade for each assessment domain. A graphical layout can then be displayed at a user interface, where the graphical layout includes a graphical representation of each application-domain-specific grade of each respective application domain of the set of application domains associated with the AI model.

A multi-dimensional grading system provides a holistic view of an AI model's performance by evaluating multiple facets of its operation. This approach ensures that no critical aspect, such as bias, robustness, or adaptability, is overlooked. By capturing the model's behavior in diverse contexts, the grading system identifies potential vulnerabilities and weaknesses across interconnected systems, proactively preventing widespread disruptions. Additionally, the multi-dimensional grading system mitigates the risk of a false sense of security by thoroughly evaluating AI models across various critical domains, including security and ethical considerations. This comprehensive evaluation uncovers hidden vulnerabilities that single-dimension assessments might miss, ensuring that AI models are robust and trustworthy before deployment. By providing a clear, multifaceted understanding of the model's strengths and weaknesses, the grading system builds trust in AI technologies, especially in sensitive sectors. This trust facilitates the broader adoption of AI, allowing these sectors to benefit from enhanced security, efficiency, and innovation. Further, the multi-dimensional grading system allows users to compare AI models against each other and established standards. This standardized approach ensures that areas of a particular AI model that need improvement are clearly identified. Consequently, organizations can make more informed decisions to improve an AI model or to choose between multiple AI models.

Similarly to the system developed for evaluating an AI model, the inventors have developed a system for determining (i) what computing aspects of a software application executed on a given platform are impacted based on obtained security vulnerabilities (e.g., from a third-party security entity) and (ii) a visual indication of a level of impact for each computing aspect with respect to security vulnerabilities. For instance, the inventors have developed a specialized model that can determine, from a third-party security entity, security vulnerabilities that are specific to computing aspects of a software application being executed on a given platform. Using the obtained security vulnerabilities, the inventors have developed a method for determining a computing aspect impact level for each computing aspect of the software application with respect to the platform to enable users to make a clear and accurate determination to whether the software application is safe to use. Furthermore, the inventors have developed an improved user interface such that a user can easily identify whether the software application is safe to use based on a graphical representation of each computing aspect impact level with respect to the software application and the platform the software application is being executed on.

In the following description, for the purposes of explanation, numerous specific details are set forth in order to provide a thorough understanding of the implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 is a block diagram showing an illustration of components used to determine platform-specific end-to-end security vulnerabilities and a graphical layout for displaying the platform-specific end-to-end security vulnerabilities via a Graphical User Interface (GUI). In various implementations, system 100 can provide a software security label 106. The software security label 106 can display information in a graphical layout that is related to the end-to-end software security of a platform-specific software application. For instance, end-to-end software security of a platform-specific software application may refer to the security measures (e.g., networking security mitigation techniques, networking security protection systems, etc.), security vulnerabilities (e.g., security threats, threat vectors, etc.) or other security information of a software application being executed on or with respect to a particular platform. As a software application may be executed on a variety of platforms, where each platform uses a combination of hardware components (and software components installed on the hardware) to host/run the software application, it is advantageous to understand the security of a given software application and whether the software application is safe to use. Logical component 102 can aggregate and analyze data from data sources/sub-models (e.g., agents 104) to generate for display a software security label 106 at a graphical user interface (GUI). Logical component 102 can be one or more of: a data model, a machine learning model, a computer program, or other logical components configured for receiving, transmitting, analyzing, or aggregating application—and/or processing—related data. Logical component 102 can analyze data received from agents 104 and generate a software security label for an end-user (e.g., a user, customer, unskilled user) to convey in an easily understood format whether a software application is safe to use. In some implementations, agents 104 can be a variety of data sources. For example, agents 104 can represent data obtained from one or more third-parties (e.g., third-party security entities). Such third-party data sources may represent industry trusted globally-accessible knowledge databases of adversary tactics and techniques that are based on real-world observations of security threats of various platforms and computer software. In some implementations, agents 104 can also be one or more machine learning models, deep-learning models, computing algorithms, or other data models configured to output security-related information of a platform and/or computer software. Logical component 102 can analyze data received by agents 104 to generate a graphical representation of end-to-end software security health such that an end-user (or alternatively, a software developer) can easily understand the safety of a software application being executed on a given platform.

Suitable Computing Environments

Figure 2:
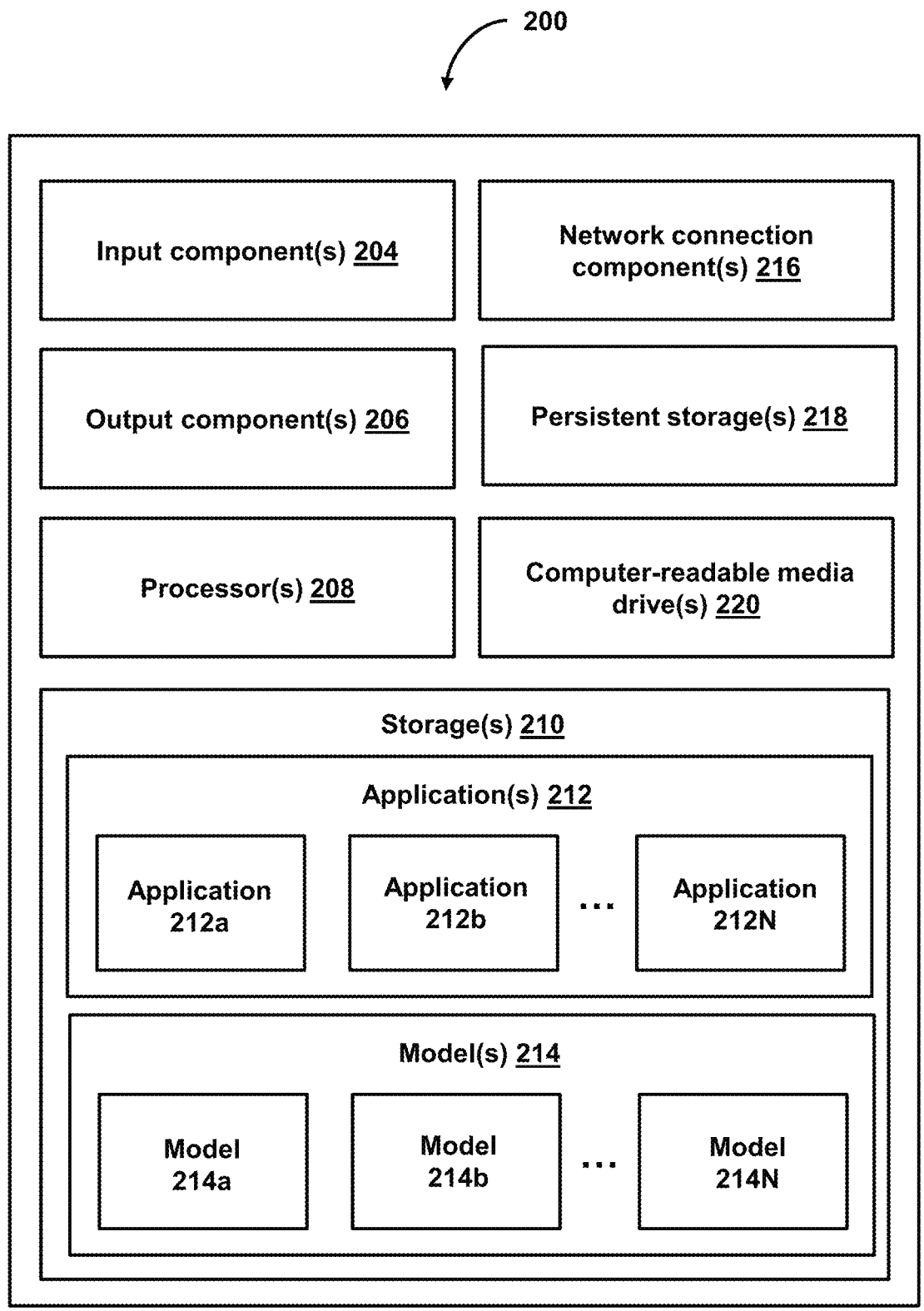
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
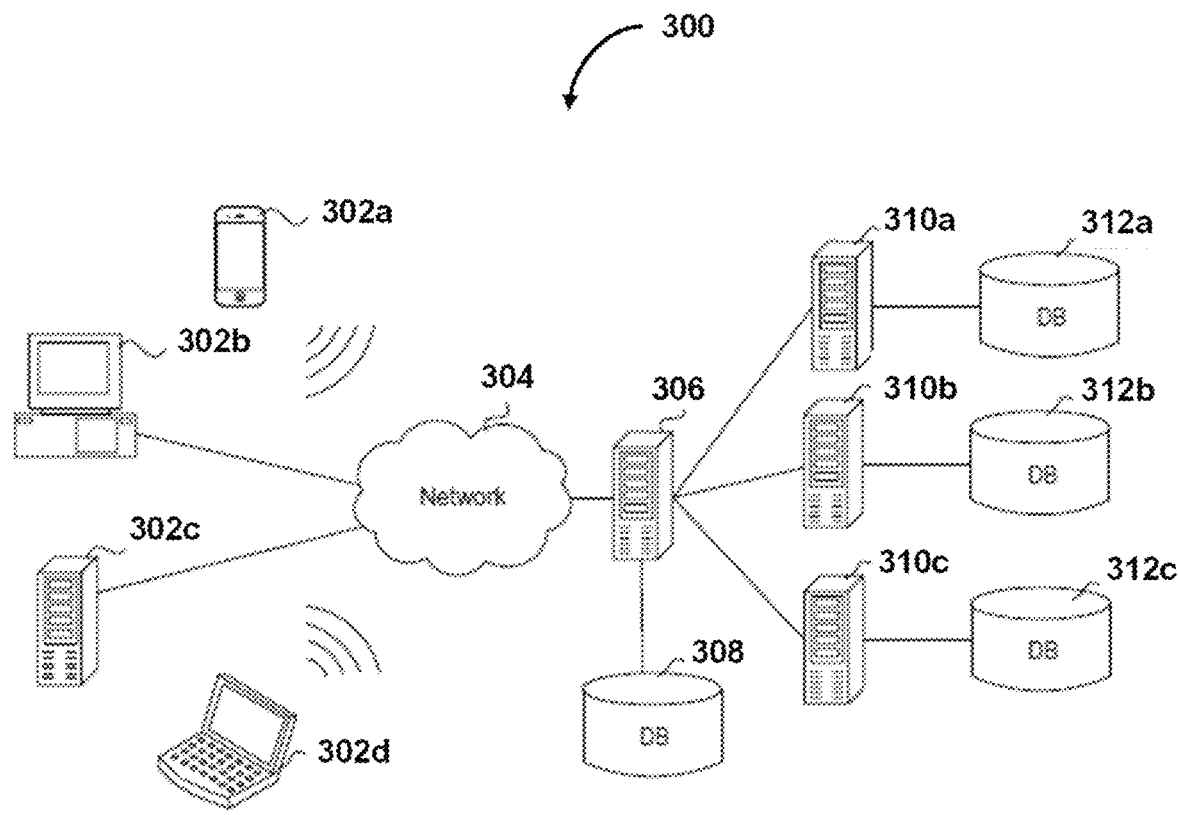
FIG. 3 is a system diagram illustrating an example of a computing environment in which the disclosed system operates in some implementations of the present technology.

FIG. 3 is a system diagram illustrating an example of a computing environment in which the disclosed system operates in some implementation. In some implementations, environment 300 includes one or more client computing devices 302*a*-*d*, examples of which can host the system 100. For example, the computing devices 302*a*-*d* can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310*a*-*c*. In some implementations, server computing devices 306 and 310 comprise computing systems, such as the system 100. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310*a*-*c*) connect to a corresponding database (308, 312*a*-*c*). As discussed above, each server 310 can correspond to a group of servers, and each of these servers can share a database or can have its own database. Databases 308 and 312 warehouse (e.g., store) information such model data, training data, test data, validation data, one or more machine learning models, predefined ranges, predefined thresholds, error thresholds, graphical representations, computing-aspect-mapping structures (e.g., assessment-domain-mapping data structure), data structures, platform identifiers, software application identifiers, security-vulnerability descriptions (e.g., security-vulnerability responses, security threats, security attack vectors, tactics, techniques, and procedures), computing-aspect identifiers (e.g., assessment-domain identifiers), platform-specific policies, mathematical formulas (e.g., weighted average, weighted sum, or other mathematical formulas), graphical elements (e.g., colors, shapes, text, images, multimedia), system protection mechanisms, networking routes, network processing routes, mitigated threat values, mitigated-computing-aspect-impact levels, computing-aspect-specific-impact levels, industry standard scoring standards, predetermined security threat values, received agent 104 information (FIG. 1), or other information.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set (discussed in more detail below in relation to FIG. 4). The training data or training set can be created by generating pairs of features (e.g., feature vectors) and/or ground-truth labels/values based on any of the data stored in databases 308 and 312. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 308 and 312 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Machine Learning Model(s)

Figure 4:
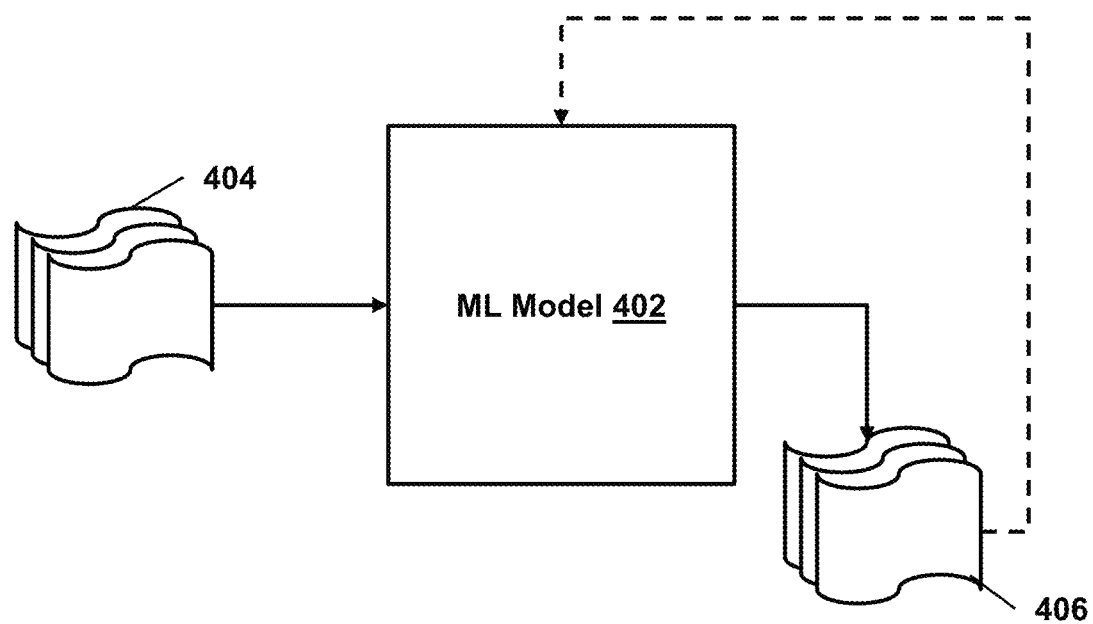
FIG. 4 is an illustrative diagram illustrating a machine learning model, in accordance with some implementations of the present technology.

FIG. 4 is an illustrative diagram illustrating a machine learning model, in accordance with some implementations of the present technology. In some implementations, machine learning model 402 can be part of, or work in conjunction with logical component 102 (FIG. 1). For example, logical component 102 can be a computer program that can use information obtained from machine learning model 402. In other implementations, machine learning model 402 may represent logical component 102, in accordance with some implementations of the present technology.

In some implementations, the machine learning model 402 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some implementations, each individual neural unit may have a summation function which combines the values of all its inputs together. In some implementations, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some implementations, neural networks may include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free-flowing, with connections interacting in a more chaotic and complex fashion.

As an example, with respect to FIG. 4, machine learning model 402 can take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 402 can be trained based on information stored in database 308 or database 312 to generate predictions related to mapping platform identifiers to one or more computing aspects. For example, database 308 may include information related to one or more platform identifiers, software application identifiers, security vulnerability information (e.g., security threats, tactics, techniques, and procedures (TTPs), or other security vulnerability information), security protection mechanisms (e.g., firewalls, encryption standards, hardware security module identifiers, communication protocols, system security policy information, or other security protection measure-related information), computing aspect identifiers (e.g., assessment-domain information, etc.) or other information. As an example, machine learning model 402 may be trained on one or more predetermined computing-aspect-mapping structures such that, when new information is provided to the machine learning model as inputs, machine learning model 402 may generate an updated or "new" computing-aspect-mapping structure that indicates a mapping of platforms to computing aspects involved with a processing of network operations. For instance, the computing-aspect-mapping structure can represent a data structure that maps platform identifiers (e.g., a cloud-based platform, a mobile application platform, third-party hosted platform, or other ecosystem of computing resources) to one or more computing-aspects (e.g., assessment domains). For example, the computing-aspect mapping structure may can be a table, graph, directed graph, array, or other data structure configured to include information related to platforms, security vulnerability descriptions, computing aspects, or other information. For instance, the computing-aspect-mapping structure may map platform identifiers to one or more computing aspects involved with a processing of network operations.

Computing-aspects may refer to any aspect of a computing system that is involved in a processing of data. For instance, a computing-aspect may be data storage, cryptography, platform usage, network, remote attestation, or other computing-aspect that is involved during the use of a software application being executed on a platform. Such computing-aspect-mapping structure can be generated to determine which computing aspects are involved with a given platform/software combination. As every software application is executed on a given platform, such as a cloud-based platform, each platform may be associated with a set of hardware and software that forms the "base layer" for a software application (e.g., as developed by one or more software developers) to be executed "on-top" of. Therefore, to accurately determine whether a software application is "safe" to use, it is important to determine which computing aspects are related to a particular platform and how the hardware/software combinations of that particular platform may impact the overall security of the software application being executed on the platform. As such, in some implementations, machine learning model 402 may be configured to generate a computing-aspect-mapping structure that may map one or more platform identifiers to one or more computing-aspects involved with a processing of data (e.g., execution of a software application) to determine a computing-aspect impact level (or assessment-domain impact level) for each computing-aspect associated with the platform.

For example, machine learning model 402 can take a first set of information as input 404. The first set of information can include platform identifiers, security vulnerability descriptions, one or more computing aspects, or other information. For example, the platform identifiers may indicate a respective platform that a software application is associated with (e.g., cloud-based application, mobile application, operating system, an identifier identifying an ecosystem of computing resources associated with the software application, or other platform identifier. The security vulnerability descriptions may indicate security vulnerability information, security threats, security attack vectors, TTPs, or other security vulnerability-related information. In some implementations, the security vulnerability descriptions may be obtained from one or more third-party security entities (e.g., a computing security related entity that provides computing threat related information, such as Mitre® or NIST®). Additionally, the one or more computing aspects may indicate predetermined categories that are related to one or more computing related aspects that are involved with a processing of network operations. As an example, the computing aspects may indicate assessment-domains, indicating a category of a process, procedure, or usage of computing function when data is processed by a computer. For instance, an assessment domain may indicate a "platform usage," "data storage," "network," "cryptography," "remote attestation," or other assessment domain. Such assessment domains may be a predetermined label to an aspect of computer functionalities related to processing network operations.

Machine learning model 402 can take the first set of information as input 404 and generate a computing-aspect-mapping structure as output 406. the computing-aspect-mapping structure may indicate a mapping of computing aspects mapped to one or more platform identifiers. For instance, prior to generating a computing-aspect impact level for each computing aspect associated with a given platform and the software application being executed on the platform, it is advantageous to determine which computing aspects are involved with the given platform. In this way, the system can later use the security vulnerability descriptions to determine how "big" or "how important" a given threat is to a specific computing aspect. Machine learning model 402 can use the security vulnerability descriptions and the platform identifiers to learn associations between the security vulnerability descriptions and the platform identifiers with respect to the predetermined computing aspects to correctly map a security vulnerability to a platform identifier. In some implementations, output 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, a predetermined computing-aspect mapping, or other information).

In some implementations, machine learning model 402 can be trained based on information stored in database 308 or database 312 to generate predictions related determining threat values. As an example, a threat value may be any value indicating a level of a threat. For instance, a threat value may indicate a level of risk associated with a given security vulnerability, security vulnerability description, or other security vulnerability information. Machine learning model 402 can take a second set of information as input 404. The second set of information can include a platform identifiers, security vulnerability descriptions, one or more computing aspects, a platform-specific policy, or other information. As an example, the platform-specific policy can indicate security impact information related to security-vulnerability descriptions. For instance, the platform-specific policy can indicate threat-aspects (e.g., threat information included in the security vulnerability descriptions) that are deemed significant to a given entity. The entity may be a service provider, company, corporation, merchant, or other entity. The entity may have a set of rules, procedures, or other guidelines/policies for handling security threats and/or security vulnerabilities that are important to the operation of one or more computing systems related to the entity as well as one or more computing aspects that are important to the one or more computing systems. As such, the platform-specific policy may act as a governing document for a particular computing platform of the entity that is associated with the handling of one or more threats, threat values, or threat mitigation values. In some implementations, the platform-specific policy may include one or more values that are assigned to security vulnerabilities and the respective computing aspects that are associated with the one or more values. As such, machine learning model 402 may use the platform-specific policy to determine or otherwise generate a threat value indicating a "threat level" (e.g., an impact of a security-vulnerability) that is specific to the entity, the associated computing platform of the entity, and the computing aspects associated with the computing platform of the entity. As an example, the entity may include various computing platforms to provide one or more services to an end-user. The entity may "care" more about a particular security vulnerability related to cryptography in a cloud-based platform/environment as opposed to the same vulnerability in a mobile application-based platform/environment. As such, the policy may indicate to give a "higher weight" to the threat value of the security vulnerability related to cryptography in the cloud-based platform/environment and give a lower weight to the same vulnerability in the mobile application-based platform/environment. In some implementations, the threat value may be a quantitative value, such as an integer, percentage, ratio, decimal value, or other quantitative value. In some implementations, the threat value may be a qualitative value, such as "high," "medium," "low," "yes," "no," or other qualitative value.

Machine learning model 402 can take the second set of information as input 404 and generate a threat value of each security vulnerability description as output 406. For instance, the machine learning model 402 can use the platform-specific policy to determine a threat value for each security vulnerability description with respect to each computing aspect of the entity's computing system by learning associations between a platform identifier, the information included in security vulnerability descriptions, the information included in the platform-specific policy, and the one or more computing aspects. In this way, the system may later use the threat values of each security vulnerability descriptions to determine how "big" or "how important" a given threat is to a specific computing aspect that is specific to the computing platform/environment of the entity. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined threat values, or other information).

In some implementations, machine learning model 402 can be trained based on information stored in database 308 or database 312 to generate predictions related determining computing aspect impact levels (e.g., assessment-domain impact levels). For example, machine learning model 402 can take a third set of information as input 404. The third set of information can include platform identifiers, security vulnerability descriptions, one or more computing aspects, a platform-specific policy, one or more impact level measures, or other information. As an example, the one or more impact level measures may indicate how to "measure" or otherwise "generate" a computing aspect impact level. For instance, the impact level measures may indicate one or more algorithms, weights, ratios, values, or mathematical formulas to serve as a basis for generating a normalized impact level. In some implementations, a computing aspect level may be a quantitative value, such as an integer, percentage, ratio, decimal value, or other quantitative value. In some implementations, the computing aspect level may be a qualitative value, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the third set of information as input 404 and generate a computing aspect impact level for each computing aspect of a set of computing aspect as output 406. For instance, the machine learning model 402 can use the impact level measures by learning associations between a platform identifier, the information included in security vulnerability descriptions, the information included in the platform-specific policy, the one or more computing aspects, and the impact level measures. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related determining mitigated-computing-aspect impact levels (e.g., mitigated-assessment-domain impact levels). For example, machine learning model 402 can take a fourth set of information as input 404. The third set of information can include platform identifiers, security vulnerability descriptions, one or more computing aspects, a platform-specific policy, one or more impact level measures, system protection measure information, mitigated threat values, or other information. As an example, the one or more system protection measure information can indicate information related to a protection system associated with a given platform and software being executed on the platform with respect to an entity. For instance, an entity may employ one or more computing system protection measures to mitigate one or more computing-related threats, attacks, or other computing/network related threats. Such protection measures can include, but are not limited to firewalls, cryptographic communication standards, hardware security modules, honeypots, intrusion detection systems, scareware, proxy servers, software updates, hardware updates, or other cybersecurity related software/hardware protection measures. In some implementations, the system protection measures can be specific to a given platform (e.g., via a platform identifier). For instance, in a cloud-based platform/environment, the entity may employ one or more proxy servers whereas in a mobile-application based platform/environment, a hardware security module may be employed. It should be noted, that any combination may exist, and such examples are merely exemplary. In some implementations, each system protection measure may be assigned a predetermined mitigated-threat-value. For example, each system protection measure may be assigned an "offset" value configured to "offset" a threat level of a security vulnerability. For instance, where a known security vulnerability of a cryptographic communication attack vector is known in a cloud-based environment, where an entity is employing a firewall, the threat value associated with the cryptographic communication attack vector may be mitigated. As such, the system may assign the threat value to the mitigated threat value to "lower" the impact level/threat level as the security vulnerability has been mitigated by the firewall. That is, the mitigated threat value level may be lower than that of the threat level currently assigned to the security vulnerability (e.g., as the entity is employing a firewall that has an effect on the attack vector). In some implementations, the mitigated threat value and the mitigated-computing-aspect-impact level may be quantitative values, such as an integer, percentage, ratio, decimal value, or other quantitative value. In some implementations, the mitigated threat value and the mitigated-computing-aspect-impact level may be a qualitative value, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the fourth set of information as input 404 and generate a mitigated threat value and/or mitigated-computing-aspect impact level for each computing aspect of a set of computing aspect, with respect to a security vulnerability as output 406. For instance, the machine learning model 402 may use the system protection measures by learning associations between a platform identifier, the information included in security vulnerability descriptions, the information included in the platform-specific policy, the one or more computing aspects, and the impact level measures, the system protection measures, or other information. In this way, the system may later use the mitigated threat values and the mitigated-computing-aspect impact levels to generate an easily understood graphical representation of mitigated-computing-aspect-impact levels. By doing so, end-users, as well as software developers, may easily view a software security label to understand whether an entity is mitigating any known security vulnerabilities, thereby improving the user experience and increasing user trust. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigated-computing-aspect-impact levels, predetermined mitigated threat values, or other information).

In some implementations, machine learning model 402 can be a blackboard machine learning model. A blackboard machine learning model can represent a blackboard architectural model where a common knowledge base (e.g., the "blackboard") is updated by differing data sources (e.g., agents 104 (FIG. 1)). For instance, the blackboard machine learning model may be configured with a first problem (e.g., generate computing aspect impact levels for a set of computing aspects associated with a platform for a software application). The blackboard machine learning model may use information supplied by the data sources (e.g., one or more agents, interactive agents, interactive models, etc.) to update the blackboard machine learning model with one or more partial solutions. In some implementations, the data sources may "publish" information to the blackboard machine learning model. When publishing information to the blackboard machine learning model, an agent or other data source may obtain information associated with the blackboard machine learning model (e.g., historical information uploaded to the blackboard machine learning model, relevant information associated with the agent, prior partial solutions, etc.) and may update the blackboard machine learning model with new information. As such, the data sources and the blackboard machine learning model work together to solve the first problem. In some implementations, where machine learning model 402 is a blackboard machine learning model, machine learning model 402 may take a fifth set of information as input 404 and generate a computing aspect impact level for each computing aspect of a set of computing aspect as output 406.

As an example, the fifth set of information may include platform identifiers, security vulnerability descriptions, one or more computing aspects, a platform-specific policy, one or more impact level measures, or other information obtained from agents 104 (FIG. 1). For instance, the machine learning model 402 may use the input information (e.g., input 404) to learn associations between the input information (e.g., thereby generating partial solutions), and may also iteratively update the blackboard model based on new input information to generate outputs 406 indicating computing aspect impact levels for each computing aspect of a set of computing aspects associated with the platform. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

Grading an AI Model Across Multiple Assessment Domains

Figure 5:
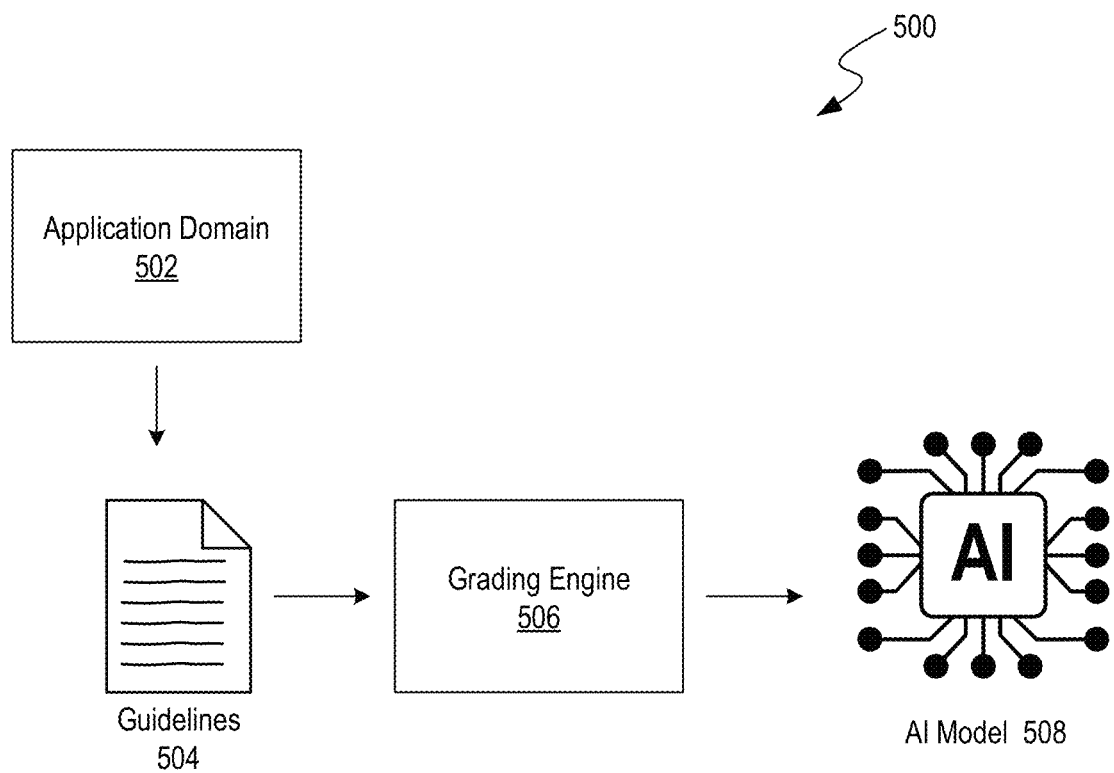
FIG. 5 is an illustrative diagram illustrating an example environment of a grading engine for grading an AI model, in accordance with some implementations of the present technology.

FIG. 5 is an illustrative diagram illustrating an example environment 500 of a grading engine for grading an AI model, in accordance with some implementations of the present technology. Environment 500 includes guidelines 504, grading engine 506, and AI model 508. Grading engine 506 and AI model 508 are implemented using components of example devices 200 and computing devices 302 illustrated and described in more detail with reference to FIG. 2 and FIG. 3, respectively. Likewise, implementations of example environment 500 can include different and/or additional components or can be connected in different ways.

Guidelines 504 define the operational boundaries, performance expectations, and/or compliance requirements that AI models 508 are evaluated against. Guidelines 504 can encompass a wide range of criteria, such as data quality, software development practices, regulatory compliance, cybersecurity measures, and other factors relevant to an AI model's 508 particular application domain 502.

The application domain 502 (e.g., dimension, operational domain) of an AI model 508 refers to the specific context or field in which the AI model 508 is intended to be used. The application domain 502 can define the environment, conditions, and requirements under which the AI model 508 will operate and provide value. The choice of application domain 502 can influence the design, development, and deployment of the AI model 508 to ensure the model's 508 effectiveness and relevance to the target problem or task. An application domain 502 can be a broad classification of an AI model 508 (e.g., cybersecurity), or a narrower classification of an AI model 508 (e.g., network security, threat detection, malware analysis, vulnerability assessment). Additional examples of application domains can include the extent of monitoring rules which allow users to customize functions of the AI model, the capacity of the AI model to compel predefined content production upon detecting certain content, the ability of the AI model to intake multi-modal inputs, and/or the scalability of the AI model. Other examples of assessment domains not listed are equally applicable in the multi-dimensional grading system.

Each of the application domains 502 represents a distinct area of focus, with specific guidelines, data sources, and objectives. Obtaining application domains 502 of an AI model 508 allows the grading engine 506 to access domain-specific benchmarks, datasets, and evaluation frameworks to benchmark the performance of AI models 508 and compare the effectiveness of different AI models 508 within the same application domain 502. For example, one or more application domains can be associated with identifying the security vulnerabilities discussed in FIGS. 1-4.

The guidelines 504 can be determined by mapping an AI model's 508 application domains 502 that indicate the domain context in which the AI model 508 will be used. For example, the guidelines can be mapped using the metadata tags, categories, or keywords associated with the AI application of the guidelines discussed further in FIG. 6. Guidelines that match the metadata tags, categories, or keywords of the application domain can be identified and retrieved to be used as the guidelines 504. The guidelines 504 can be dynamic and adaptable, evolving over time to reflect changing regulatory requirements, emerging threats, and industry best practices. Further examples of guidelines 602 and determining the guidelines are discussed with reference to FIG. 6 and FIG. 9, respectively.

The grading engine 506 obtains the guidelines 504. Once the guidelines are obtained, the grading engine 506 proceeds to evaluate the AI model's 508 performance based on the guidelines 504. The evaluation process can include interpreting the guidelines 504, accessing the assessment domains (e.g., test categories) from the guidelines 504, and testing the AI model 508 against the test categories through a series of assessments (e.g., tests). The results of the evaluations are used to generate grades or scores, indicating the AI model's 508 overall performance and compliance with the obtained guidelines 504. Further methods of using the grading engine 506 to evaluate the AI model 508 are discussed with reference to FIG. 9.

For example, even if the guidelines 504 exist in different formats and structures, Natural Language Processing (NLP) techniques can be used to parse each text and identify key regulations, policies, and practices embedded within the differently formatted guidelines 504. The grading engine 506 can identify specific terms, phrases, or clauses that likely denote regulatory requirements, as well as understand the context and intent behind these provisions. For example, the grading engine 506 identifies terms or phrases indicating regulations concerning the collection of personal data, such as "consent," "data minimization," or "lawful basis," and categorizes guidelines 504 including the identified words and phrases as containing provisions related to obtaining user consent for data processing or specifying permissible purposes for data collection. Further methods of identifying relevant features within the guidelines 602 are discussed with reference to FIG. 6.

The AI model 508 is a computational system trained on large datasets to perform specific tasks, such as natural language processing. Once the AI model 508 is trained, the AI model 508 generates responses or predictions in response to receiving input. For example, in a natural language processing task, the AI model 508 can be trained to receive natural language input (e.g., textual or spoken language), process this input using the AI model's 508 internal algorithms and learned patterns, and produce an output that corresponds to the task's objective, such as generating a coherent response to a user query or completing a given sentence.

Figure 6:
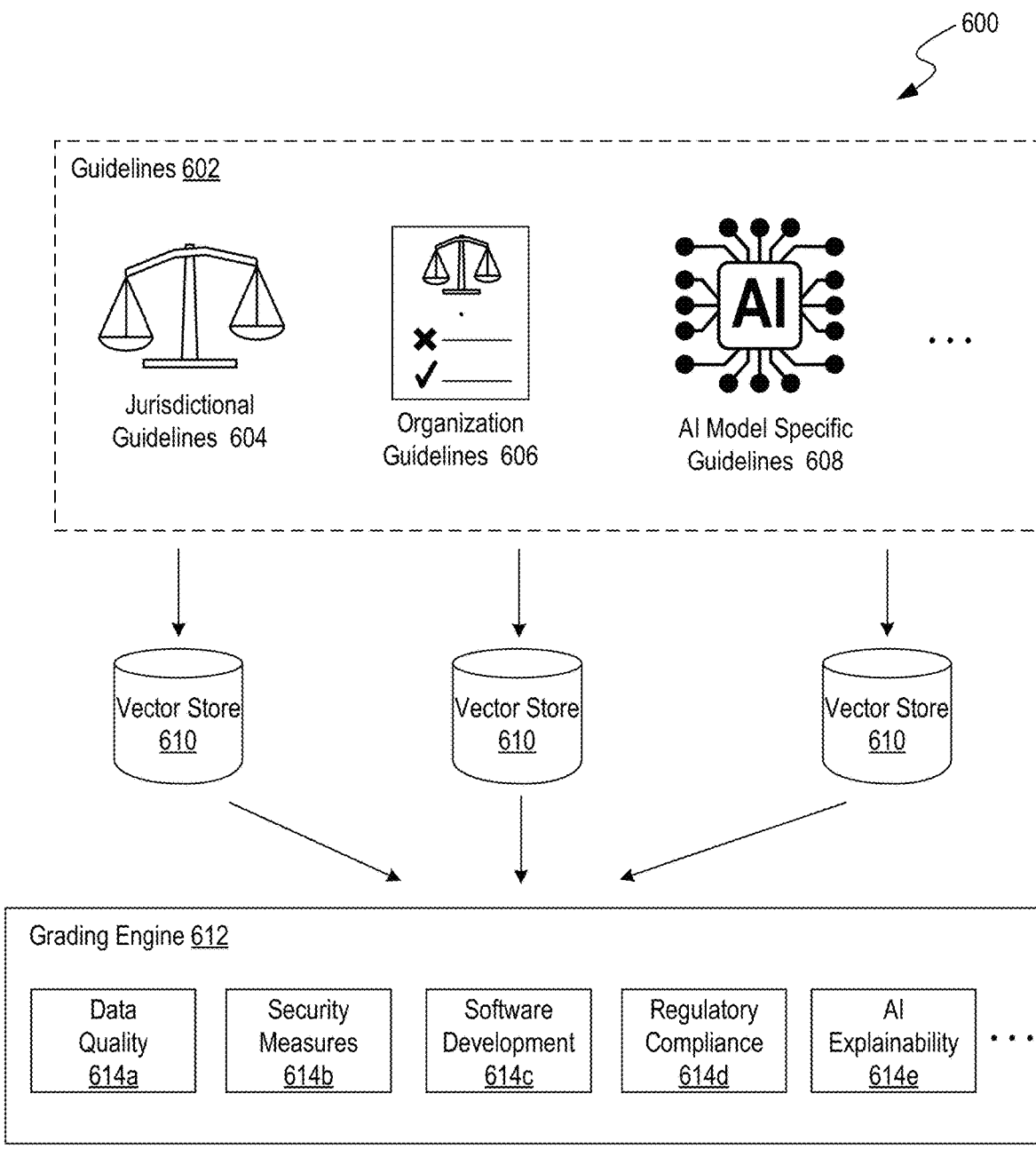
FIG. 6 is an illustrative diagram illustrating an example environment for grading an AI model using guidelines stored in a vector store.

FIG. 6 is an illustrative diagram illustrating an example environment 600 for grading an AI model using guidelines stored in a vector store. Environment 600 includes guidelines 602, vector store 610, and grading engine 612, which includes test categories 614a-e. Guidelines 602 is the same as or similar to guidelines 504 illustrated and described in more detail with reference to FIG. 5. Grading engine 612 is the same as or similar to grading engine 506 illustrated and described in more detail with reference to FIG. 5. Grading engine 612 is implemented using components of example devices 200 and computing devices 302 illustrated and described in more detail with reference to FIG. 2 and FIG. 3, respectively. Likewise, implementations of example environment 600 can include different and/or additional components or can be connected in different ways.

The guidelines 602 can be determined using obtained application domains (e.g., domain contexts) of the AI model. Methods of determining the guidelines 602 are discussed with reference to FIG. 9. Guidelines 602 can include various elements such as jurisdictional guidelines 604, organizational guidelines 606, and AI applications-specific guidelines 608 (e.g., unsupervised learning, natural language processing (NLP), generative AI). Jurisdictional guidelines 604 (e.g., governmental regulations) can include guidelines gathered from authoritative sources such as government websites, legislative bodies, and regulatory agencies. Jurisdictional guidelines 604 can be published in legal documents or official publications and cover aspects related to the development, deployment, and use of AI technologies within specific jurisdictions. For example, the California Consumer Privacy Act (CCPA) in the United States mandates cybersecurity measures such as encryption, access controls, and data breach notification requirements to protect personal data. As such, AI developers must implement cybersecurity measures (such as encryption techniques) within the AI models they design and build (e.g., AI model 508 in FIG. 5) to ensure the protection of sensitive user data and compliance with the regulations.

Organizational guidelines 606 include internal policies, procedures, and guidelines established by organizations to govern software-and/or AI-related activities within the organization's operations. Organizational guidelines 606 can be developed in alignment with industry standards, legal requirements, best practices, and organizational objectives. For example, organizational guidelines can require AI models (e.g., AI model 508 in FIG. 5) to include certain access controls to restrict unauthorized access to the model's APIs or data and/or have a certain level of resilience before deployment.

In some implementations, guidelines 602 can any one of text, image, audio, video or other computer-ingestible format. For guidelines 602 that are not text (e.g., image, audio, and/or video), the guidelines 602 can first be transformed into text. Optical character recognition (OCR) can be used for images containing text, and speech-to-text algorithms can be used for audio inputs. For example, an audio recording detailing security guidelines can be converted into text using a speech-to-text engine that allows the system to parse and integrate the text output into the existing guidelines 602. Similarly, a video demonstrating a particular procedure or protocol can be processed to extract textual information (e.g., extracting captions). The text can then be analyzed and structured into guidelines for the AI model to follow as discussed in more detail with reference to FIG. 9.

In some implementations, in cases where transforming to text is not feasible or desirable, the system can use vector comparisons to handle non-text inputs directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file). The system can then perform vector comparisons between the inputs and the outputs of the AI model to determine the satisfaction of the AI model with guidelines 602. For example, an image depicting a secure login process can be compared against a library of vectors representing various secure and insecure login methods. If the image vector closely aligns with vectors in the secure category, it can be positively assessed; otherwise, the AI model can be flagged for review.

AI application-specific guidelines 608 include guidelines that pertain to specific types of AI applications, such as unsupervised learning, natural language processing (NLP), and generative AI. Each type of AI application presents unique challenges and considerations in terms of best practices, compliance, ethical use, and/or regulatory adherence. For example, unsupervised learning algorithms, where the model learns from input data without labeled responses, may be subject to regulations that prevent bias and discrimination in unsupervised learning models. Natural language processing (NLP) technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/or user consent management to comply with regulations related to generative AI technologies.

Best practices in the guidelines 602 can include the resilience of the AI model or the data quality the AI model is trained on. For example, best practices for AI model resilience involve ensuring the AI model's ability to withstand cyber threats and adversarial attacks. The AI model is expected to implement security measures within the model architecture, such as encryption, access controls, and anomaly detection algorithms, to detect and mitigate potential security breaches or attacks. Further, ensuring the quality of training data can include thorough data quality assessments to identify and mitigate biases, anomalies, and inaccuracies in the training dataset. Data pre-processing techniques, such as data normalization and outlier detection, can be expected to be applied to enhance the quality and integrity of the training data, reducing the risk of security incidents.

The guidelines 602 can be stored in a vector store 610. The vector store 610 stores the guidelines 602 in a structured and accessible format (e.g., using distributed databases or NoSQL stores), which allows for efficient retrieval and utilization by the grading engine 612. In some implementations, the guidelines 602 are preprocessed to remove any irrelevant information, standardize the format, and/or organize the guidelines 602 into a structured database schema. Once the guidelines 602 are prepared, the guidelines 602 can be stored in a vector store 610 using distributed databases or NoSQL stores.

To store the guidelines 602 in the vector store 610, the guidelines 602 can be encoded into vector representations for subsequent retrieval by the grading engine 612. The textual data of the guidelines 602 are transformed into numerical vectors that capture the semantic meaning and relationships between words or phrases in the guidelines 602. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 602. For example, the system can assign higher weights to words that are more unique to a specific document and less common across the entire corpus.

In some implementations, the guidelines 602 are stored using graph databases such as Neo4j™ or Amazon Neptune™. Graph databases represent data as nodes and edges, allowing for the modeling of relationships between guidelines 602 to demonstrate the interdependencies. In some implementations, the guidelines 602 are stored in a distributed file system such as Apache Hadoop™ or Google Cloud Storage™. These systems offer scalable storage for large volumes of data and support parallel processing and distributed computing. Guidelines 602 stored in a distributed file system can be accessed and processed by multiple nodes simultaneously, which allows for faster retrieval and analysis by the grading engine 612.

The vector store 610 can be stored in a cloud environment hosted by a cloud provider, or a self-hosted environment. In a cloud environment, the vector store 610 has the scalability of cloud services provided by platforms (e.g., AWS™, Azure™). Storing the vector store 610 in a cloud environment entails selecting the cloud service, provisioning resources dynamically through the provider's interface or APIs, and configuring networking components for secure communication. Cloud environments allow the vector store 610 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 610 is stored on a private web server. Deploying the vector store 610 in a self-hosted environment entails setting up the server with the necessary hardware or virtual machines, installing an operating system, and storing the vector store 610. In a self-hosted environment, organizations have full control over the vector store 610, allowing organizations to implement customized security measures and compliance policies tailored to the organization's specific needs. For example, organizations in industries with strict data privacy and security regulations, such as finance institutions, can mitigate security risks by storing the vector store 610 in a self-hosted environment.

The grading engine 612 accesses the guidelines 602 from the vector store 610 to initiate grading the AI model. The grading engine 612 can establish a connection to the vector store 610 using appropriate APIs or database drivers. The connection allows the grading engine 612 to query the vector store 610 and retrieve the relevant guidelines for the AI application under evaluation. Frequently accessed guidelines 602 can be stored in memory, which allows the grading engine 612 to reduce latency and improve response times for compliance assessment tasks.

In some implementations, only the relevant guidelines are retrieved based on the specific AI application under evaluation. For example, metadata tags, categories, or keywords associated with the AI application can be used to filter the guidelines 202. Example methods of identifying relevant guidelines are discussed further in FIG. 9. The grading engine 612 evaluates the AI application against the retrieved guidelines 602. Further evaluation techniques in grading the AI application are discussed with reference to FIG. 9.

Assessment domains, such as test categories 614*a-e*, encompass various aspects of evaluating the AI model's performance and adherence to predefined guidelines. Each assessment domain is designed to assess a specific context, such as data quality 614*a*, security measures 614*b*, software development 614*c*, regulatory compliance 614*d*, and/or AI explainability 614*e*. The test categories 614*a-e* can overlap in the corresponding contexts.

Data quality 614*a* evaluates the quality, accuracy, and integrity of the data used to train and operate the AI model. The test category includes tests to identify biases, anomalies, and inconsistencies in the training data. Security measures 614*b* assesses the AI model's resilience against cyber threats and vulnerabilities. The test category includes tests for data encryption, access controls, vulnerability management, threat detection, and remediation capabilities to protect against cyberattacks and unauthorized access to sensitive information. Software development 614*c* evaluates the robustness and reliability of the software development practices used to build and deploy the AI model. For example, software development 614*c* includes tests for code quality, version control, testing methodologies, and deployment procedures to ensure the integrity and stability of the AI model throughout its lifecycle. The regulatory compliance 614*d* test category assesses the AI model's adherence to relevant legal and regulatory requirements governing its use and deployment. Regulatory compliance 614*d* includes tests to verify compliance with data protection laws, industry regulations, and ethical guidelines, ensuring that the AI model operates within the boundaries of applicable regulations. The AI explainability test category focuses on the AI model's ability to provide transparent and interpretable explanations for its decisions and predictions. For example, the test category includes tests to evaluate the model's reasoning behind the model's outputs and ensure that the reasoning does not violate other guidelines. Additional test categories 614*a-e* can include any context of the AI model that the user desires to evaluate. For example, the grading engine 612 can evaluate performance efficiency by assessing the efficiency and optimization of the AI model's performance, and include tests for resource utilization, latency, and scalability. Additionally, the test categories 614*a-e* can include testing an AI model's resilience against adversarial attacks and attempts to manipulate its outputs.

Figure 7:
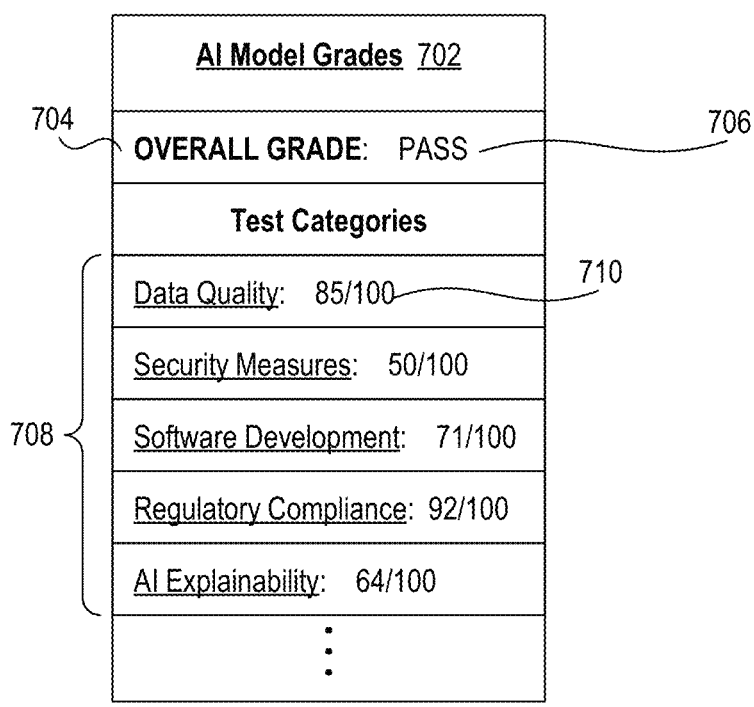
FIG. 7 is an illustrative diagram illustrating an example environment presenting application-domain-specific grades generated for an AI model.

FIG. 7 is an illustrative diagram illustrating an example environment 700 presenting application-domain-specific grades generated for an AI model. Environment 700 includes an overall set of grades 702, an overall grade 704, a binary indicator 706, test categories 708, and individual grades 710. Test categories 708 is the same as or similar to test categories 614*a-e* illustrated and described in more detail with reference to FIG. 6. The AI model is the same as or similar to AI model 508 illustrated and described in more detail with reference to FIG. 5. Likewise, implementations of example environment 700 can include different and/or additional components or can be connected in different ways.

The overall set of grades 702 presents a cumulative view of the AI model's grading evaluation. The overall set of grades 702 is a holistic assessment of the AI model's capabilities, reliability, and adherence to predefined guidelines (e.g., guidelines 504 in FIG. 5 or guidelines 602 in FIG. 6). In some implementations, the overall set of grades 702 includes an approximation of the weights, biases, and/or activation functions that the AI model should follow to satisfy the guidelines. The overall set of grades can indicate what the AI model currently follows. A comparison between the weights, biases, and/or activation functions of what the AI model should follow and what the AI model currently follows can be used to identify discrepancies between the desired performance and the actual performance of the AI model. Weights in an AI model can be defined as the parameters within the model that transform input data used by the AI model to produce the output. Biases are additional parameters that allow the model to adjust the output along with the weighted sum of the inputs to the neuron, and activation functions determine the output of a neural network node.

Using the assessments that test the AI model against the guidelines, the system can identify the variations and, in some implementations, suggest adjustments in the weights and biases or recommend different activation functions that would potentially enhance the model's performance. For instance, if an AI model uses a ReLU (Rectified Linear Unit) activation function but performs poorly in specific scenarios, the system can suggest experimenting with a different function like Leaky ReLU or SELU (Scaled Exponential Linear Unit). By adjusting the weights, biases, and/or activation functions, developers can refine the AI model to align more closely with the desired level of satisfaction with the guidelines. For example, suggestions can include using a universal data format, tagging metadata, or implementing more security measures in storing data.

Overall grade 704 is an aggregated representation of the individual grades 710 assigned to the AI model based on its performance in different test categories. Overall grade 704 provides a single, summarized rating of the AI model's performance. This overarching grade offers users a concise representation of the AI model's overall quality, allowing for quick assessments and decision-making. In some implementations, a binary indicator 706 can be included to signify whether the AI model meets specific criteria or thresholds, such as regulatory compliance or certification requirements (e.g., "PASS," "FAILED").

Test categories 708 includes the areas evaluated by the grading engine, which can include assessment domains such as data quality, security measures, software development practices, regulatory compliance, and AI explainability. Further examples of test categories 614*a*-*e* and test category 802 are described in further detail with reference to FIG. 6 and FIG. 8, respectively. Each test category of the test categories 708 provides users with insights into the AI model's performance in key areas, helping them identify strengths, weaknesses, and areas for improvement. The assessment-domain-specific grades, or individual grades 710, received from each test category 708 are described in further detail with reference to assessment-domain-specific grade 808 in FIG. 8.

In some implementations, tiered indicators may be included to categorize the AI model into different tiers or levels based on its performance. These tiered indicators offer a structured framework for classifying AI models according to predefined criteria, such as performance thresholds for each tier or tiers based on compliance standards. By categorizing AI models into tiers, users can identify differences in performance and make informed decisions about their suitability for specific applications or use cases (e.g., filtering AI models by tier). The benchmarking process provides context for the overall set of grades and helps organizations assess the model's performance relative to other models.

Figure 8:
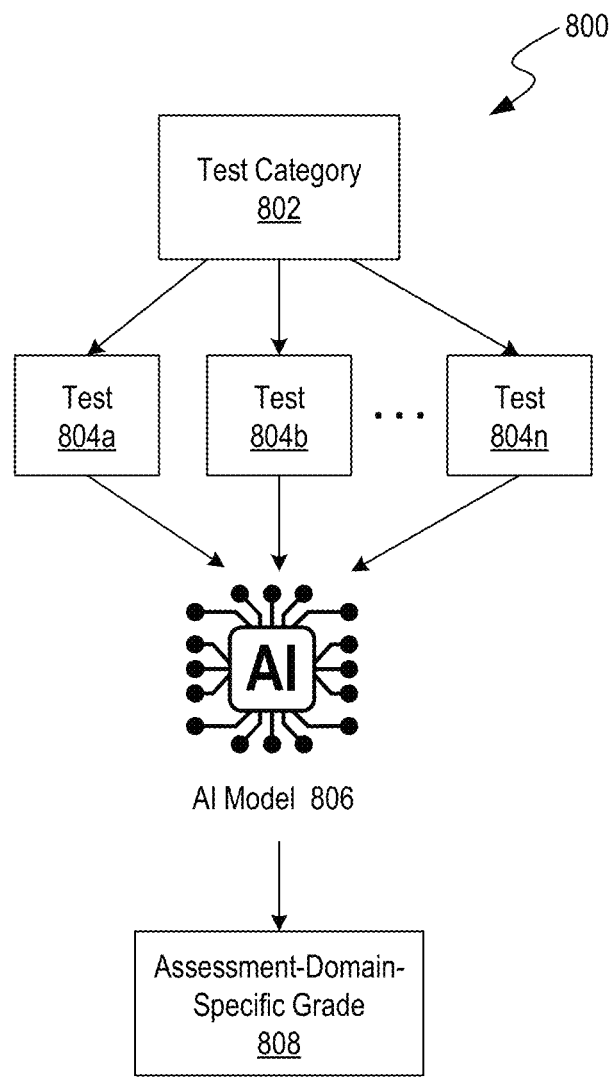
FIG. 8 is an illustrative diagram illustrating an example environment for assigning a grade to an AI model for a test category.

FIG. 8 is an illustrative diagram illustrating an example environment 800 for assigning a grade to an AI model for a test category. Environment 800 includes a test category 802, tests 804*a*-*n*, AI model 806, and assessment-domain-specific grade 808. Test categories 802 is the same as or similar to one or more test categories 614*a*-*e* and test categories 708 illustrated and described in more detail with reference to FIG. 6 and FIG. 7. Assessment-domain-specific grade 808 is the same as or similar to one or more individual grades 710 illustrated and described in more detail with reference to FIG. 7. The AI model 806 is the same as or similar to AI model 508 illustrated and described in more detail with reference to FIG. 5. Likewise, implementations of example environment 800 can include different and/or additional components or can be connected in different ways.

Test category 802 defines the specific criteria against which the AI model's performance will be evaluated. Test categories such as data quality, security measures, software development practices, regulatory compliance, or AI explainability may be included, depending on the objectives and requirements of the evaluation. Further examples of test categories 614*a*-*e* are described with reference to FIG. 6.

Within each test category, a series of tests 804*a*-*n* are conducted to assess the AI model's adherence to and/or satisfaction with the corresponding predefined guidelines of the test category. The series of tests 804*a*-*n* evaluate different aspects or sub-components of the test category 802 and can provide a multi-prompt assessment of the AI model's performance across various dimensions. For example, in a data quality test category, individual tests may focus on aspects such as bias detection, data completeness, or outlier detection. The bias test examines the AI model's training data for any biases that may lead to discriminatory or unfair outcomes. The bias test analyzes the distribution of data across different demographic groups and identifies any patterns of bias that may exist. The data completeness test evaluates the completeness of the AI model's training data by assessing whether the metadata of the training data has missing values, incomplete records, and/or other gaps in the data that could affect the AI model's performance. To test for outliers, the AI model's training data is evaluated for anomalies that deviate significantly from the norm. For example, one or more of the tests testing for outliers can aim to identify data points that are unusually large, small, or different from the majority of the dataset, which could potentially skew the AI model's predictions.

The system can assess the data quality by evaluating the AI model's performance metrics such as accuracy, precision, recall, and F1 score. For example, if an AI model consistently misclassifies certain types of data or shows a significant drop in performance in specific scenarios, this could indicate underlying data quality issues. Additionally, the system can identify out-of-distribution data, regime changes, or shifts in data distribution that could affect model performance. Further, the system can identify the AI model's use case limitations. For example, a model trained extensively on financial data from a specific region may not perform well when applied to data from a different region due to differences in regulatory environments. Analyzing the AI model's limitations helps in setting realistic expectations for the AI model's performance and identifying areas where additional data or retraining might be necessary.

In some implementations, for prompt-based AI models such as large language models (LLMs), prompts are input into the AI model 806 to initiate the tests 804*a*-*n* within each category. The prompts can take various forms depending on the nature of the test. For example, the prompt can be a simulated scenario of particular security incidents, or specific queries about the AI model's model architecture. For example, in a test category focusing on threat detection, prompts may simulate suspicious network activity or attempt to breach system security. The AI model 806 receives the prompts of the tests 804*a*-*n* defined by the test category 802 and generates responses or outcomes based on the AI model's 806 algorithms. For instance, in response to a prompt about identifying potential malware in network traffic, the AI model 806 may analyze packet headers, payload contents, and behavioral patterns to make a determination, and output whether or not there is malware and why the AI model came to that conclusion (e.g., abnormal behavior patterns). The responses are then compared against predefined expectations or benchmarks to determine the AI model's 806 performance in each test. The comparison process assesses how closely the AI model's 806 responses align with expected responses. Further methods of comparing the AI model's 806 response with the expected responses are described with reference to FIG. 9.

Based on the results of the tests conducted within the test category 802, an assessment-domain-specific grade 808 is assigned to the AI model. This grade reflects the AI model's overall performance in meeting the criteria outlined by the test category, providing users with valuable insights into its strengths, weaknesses, and areas for improvement within that specific dimension. For example, a high grade can indicate that the AI model 806 demonstrates strong capabilities in detecting and mitigating security threats, while a lower grade can signal areas of improvement or potential vulnerabilities that need to be addressed.

Figure 9:
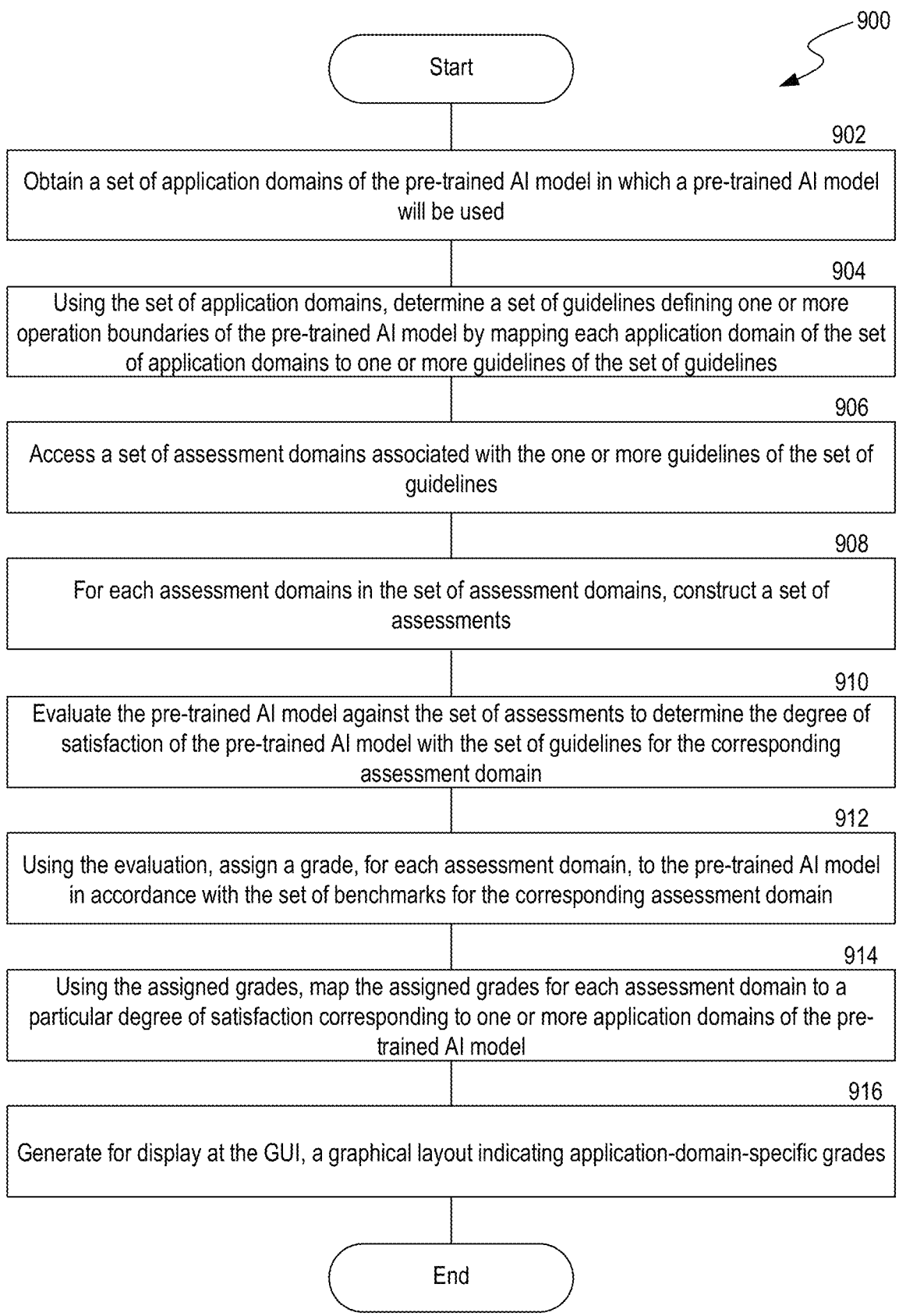
FIG. 9 is a flow diagram illustrating a process of grading an AI model, in accordance with some implementations of the present technology.

FIG. 9 is a flow diagram illustrating a process of grading an AI model, in accordance with some implementations of the present technology. In some implementations, the process 900 is performed by components of example devices 200 and computing devices 302 illustrated and described in more detail with reference to FIG. 2 and FIG. 3, respectively. Particular entities, for example, AI model 508, are illustrated and described in more detail with reference to FIG. 5. Likewise, implementations can include different and/or additional steps or can perform the steps in different orders.

In act 902, the system obtains a set of application domains of the pre-trained AI model in which a pre-trained AI model will be used. In some implementations, the application domains can be received as an input. For example, the input can be provided by users, administrators, or automated systems responsible for configuring and deploying the AI model. Users can specify the intended application domains based on their knowledge of the model's capabilities and the requirements of their organization or use case. In some implementations, the system can determine the application domain of the AI model by parsing through the metadata. Metadata associated with the AI model can include information about the AI model's training data, objectives, intended use cases, and other relevant details. By analyzing this metadata, the system can infer the potential application domains where the AI model is likely to be effective and appropriate. For example, if the training data of the AI model specifies multiple fields related to cybersecurity (e.g., access timestamp, access location, userID, authentication success), the system can infer, using an ML model trained on labeled data indicating the application domains of sample data, that the AI model has at least one application domain focused on cybersecurity.

In some implementations, the system can maintain a catalog of application domains. The system can gather and organize information from various sources, such as receiving direct input from users or extracting application domains from external sources. The catalog of application domains serves as a repository that helps the system in understanding the various contexts (e.g., application domains) in which AI models can be deployed. For example, the system identifies relevant sources of information (e.g., industry-specific guidelines, regulatory requirements). Structured data formats can be used to store tabular information, while unstructured formats like text files or documents can capture more complex information. Additionally, vectorized representations can be used to encode semantic information, facilitating advanced retrieval techniques such as retrieval-augmented generation (RAG).

To ensure the catalog remains accurate and up-to-date, the system can include versioning and timestamping of each application domain. Versioning allows for tracking changes over time, providing a historical record of how application domains have evolved. Timestamps indicate when the information was last updated, ensuring users can assess the currency of the data. For instance, regulatory requirements might change frequently, and having versioned records ensures that AI models can be tested against the most current standards. Metadata can be created to add context and facilitate search and retrieval. Examples of metadata include the regulation name, descriptive names, and other relevant identifiers. In some implementations, the system can identify application domains of the AI model using a metadata lookup against guideline data stores or remote sources. By querying metadata repositories, the system can automatically infer the application domains relevant to the model, thus reducing the need for manual input. For example, if a metadata repository includes descriptions of different AI models, the AI model's corresponding training data, performance metrics, and/or associated guidelines, when a new AI model is introduced, the system can perform a metadata lookup to find matches or similarities with existing models in the repository. This process involves comparing the model's metadata—such as its objectives, training data sources, and functional specifications—with the stored metadata of other models. If the system identifies a close match, it can infer that the new model belongs to the same or a similar application domain. For example, if an AI model's metadata indicates that it was trained on financial transaction data and designed to detect fraud, the system can automatically classify it under the domain of financial security or fraud detection.

In act 904, using the set of application domains, the system determines a set of guidelines defining one or more operation boundaries of the pre-trained AI model by mapping each application domain of the set of application domains to one or more guidelines of the set of guidelines. The pre-trained AI model generates, in response to a received input, a response. The response can include a case-specific outcome and a case-specific explanation of how the outcome was determined. The guidelines can include governmental regulations of a specific jurisdiction, organization-specific regulations, and/or AI application type-specific guidelines. The set of guidelines can be stored in a vector space representation, where the set of guidelines is stored in a structured format. Examples of guidelines 602, as well as storing guidelines 602 in vector stores 610, are described further with reference to FIG. 6.

The system can, from the obtained set of application domains, determine relevant guidelines that are applicable to the AI model's use case (e.g., generating a certain set of guidelines for any AI model used in the finance industry, and generating another set of guidelines for any AI model used in the healthcare industry. Having consistent guidelines for each industry allows the AI models to be benchmarked more accurately against its peers, as the AI models are evaluated against the same guidelines. Additionally or alternatively, the system can create a new set of relevant guidelines for each AI model. The system can evaluate metadata tags, keywords, or categories associated with the guidelines stored in the system's database. Using the specific context and requirements of the AI application, the system filters and retrieves the relevant guidelines from the database.

Various filters can be used to select relevant guidelines. In some implementations, the system uses natural language processing (NLP) to parse through the text of the guidelines and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant guidelines.

To identify the relevant guidelines from guidelines stored in vector stores, the system can determine the specific terms to use as filters by calculating the similarity between vectors representing application-domain-specific terms (e.g., "healthcare") and vectors representing other terms related to the domain (e.g., "patient privacy"), application-domain-specific terms can be identified based on the proximity of the other terms to known terms of interest. A similarity threshold can be applied to filter out terms that are not sufficiently similar to known application-domain-specific terms.

In some implementations, the system can tag relevant guidelines with attributes that help contextualize the relevant guidelines. The tags serve as markers that categorize and organize the guidelines based on predefined criteria, such as the application domain itself, and/or narrower context such as the regulatory topics (e.g., data privacy, fairness, transparency) or jurisdictional relevance (e.g., regional regulations, industry standards). The tags provide a structured representation of the guidelines and allow for easier retrieval, manipulation, and analysis of regulatory content. The tags and associated metadata can be stored in a structured format, such as a database, where each guideline is linked to the guideline's corresponding tags and application domains. Additionally, the guidelines can be represented in a vector space model, where each guideline is mapped to a high-dimensional vector representing the guideline's semantic features and relationships with other guidelines.

In some implementations, the system determines the set of guidelines, via an ML model, using a location of the pre-trained AI model, a use case of the pre-trained AI model, and/or data sources used in the pre-trained AI model. When a new AI model is introduced, the ML model can analyze metadata associated with the AI model, such as the AI model's deployment location, intended application, and data sources. Based on this analysis, the ML model generates predictions about the relevant guidelines that should be considered for evaluating the AI model's performance and compliance. In some implementations, rule-based systems are used to determine the relevant guidelines. Predefined rules and decision criteria can be applied to each AI model to infer the relevant guidelines. For example, certain application domains are assigned a set of predefined guidelines.

With the set of application domains, the system can identify specific fields (e.g., features or variables of the data) used in each step of the AI model's operations. For example, in a threat detection domain, the necessary fields can include network traffic data, user activity logs, and known threat signatures. In some implementations, the guidelines are used to determine a breakdown of positive values for certain fields (e.g., enumerations). Enumerations can include predefined lists of acceptable values or ranges that a field can take. For instance, in an access control AI model, enumerations can include the different roles or permission levels within an organization.

For example, in an AI model designed for financial fraud detection, the appropriate application domain is determined by analyzing guidelines related to financial transactions, regulatory compliance, and fraud patterns. External sources, such as updates from financial regulatory bodies, can be used to determine the relevant guidelines. The system identifies fields used in the assessment domain, such as transaction amount, frequency, account history, and geolocation. Using the guidelines, the system defines enumerations for transaction types, acceptable geographical regions, and frequency thresholds.

In act 906, the system accesses and/or generates a set of assessment domains (e.g., test categories 802 in FIG. 8) associated with one or more guidelines of the set of guidelines. For example, accessing the assessment domains can include retrieving predefined categories or domains that have been established beforehand to encompass different aspects of the AI model's functionality or behavior. These assessment domains can be, for example, based on the specific objectives of the evaluation. In some implementations, the system can generate test categories dynamically based on the characteristics of the guidelines or the specific requirements of the evaluation.

In some implementations, the system can obtain a new set of guidelines and identify one or more new assessment domains associated with the new set of guidelines. If new assessment domains are identified, the system can iteratively update the set of assessment domains by adding one or more new assessment domains to the set of assessment domains. By iteratively updating the set of assessment domains, the system ensures that the evaluation process remains comprehensive and up-to-date with the guidelines (e.g., regulations, best practices), since guidelines can evolve over time.

Each of the set of assessment domains includes a set of benchmarks. Each benchmark in the set of benchmarks indicates a degree of satisfaction of the pre-trained AI model with one or more guidelines associated with the corresponding assessment domain. The system can use existing frameworks or standards to define the benchmarks for each assessment domain. By using established frameworks, the system ensures that the benchmarks are comprehensive, relevant, and widely accepted within the community.

The degree of satisfaction (e.g., degree/level of compliance, level of satisfaction, degree/level of adherence) refers to the level to which a pre-trained AI model meets or aligns with specific guidelines or benchmarks associated with a particular assessment domain. Each benchmark within the set of benchmarks is a metric for measuring the AI model's satisfaction with these guidelines. The benchmark provides a quantifiable indication of how well the model performs in meeting the specified criteria or standards, thus assessing the AI model's suitability for its designated purpose. A high degree of satisfaction indicates a strong alignment with the guidelines, signifying that the model performs well according to the specified metrics. Conversely, a lower degree of satisfaction suggests areas where the model may fall short or require further refinement to better meet the established criteria. This quantification can take various forms, including numeric values, percentages, or qualitative assessments, depending on the nature of the guidelines and the metrics used for evaluation. For example, in a classification task, a numerical score can be an accuracy score that indicates the percentage of correctly predicted instances, while in language generation tasks, non-numerical metrics can gauge the quality of the generated text. Percentages can be used to indicate the proportion of criteria met or satisfied by the AI model out of the total number of criteria evaluated, with higher percentages indicating greater alignment with the specified criteria. In some implementations, the degree of satisfaction can be expressed as a range or scale. For example, a scoring system ranging from 1 to 10 could be used to rate the model's adherence to each benchmark, with higher scores indicating better alignment and lower scores suggesting areas for improvement. Qualitative assessments can be employed to characterize the degree of satisfaction. Descriptive categories such as "excellent," "good," "fair," or "poor" can be used to classify the model's performance relative to each benchmark, providing qualitative insights into the AI model's strengths and weaknesses.

In some implementations, one or more of the assessment domains within the set of assessment domains relate to the quality of training data of the pre-trained AI model. The corresponding set of tests can relate to a presence of bias within the training data, a presence of structured metadata in the training data, and/or a presence of outliers in the training data. To evaluate the presence of bias within the training data, the system can design tests that assess the distribution of data across different demographic groups or attributes to identify any disproportionate demographic representations in the AI model's response. Similarly, the system can test to evaluate the presence of structured metadata in the training data. Metadata provides context and organization to the raw data, and can include labels, tags, or annotations that describe the characteristics and attributes of the data used by the AI model. Furthermore, the system can detect outliers within the training data, which are data points that deviate significantly from the rest of the dataset. Outliers can distort the training process and lead to inaccurate or unreliable AI model predictions. The tests can use anomaly detection algorithms to identify outliers and assess their impact on the AI model's performance.

In some implementations, the system can grade an AI model's training data documentation by evaluating how well the documentation is recorded. The benchmarks can include predetermined criteria or metrics that the documentation should include. For example, in the context of cybersecurity, benchmarks can include requiring documentation to document the accuracy of malware detection and/or the speed of incident response. Additionally, the benchmarks can include requiring the documentation to explain characteristics of the training data, such as, for example, explaining the criteria for measurement and the significance of each metric in assessing the model's performance. In some implementations, a higher grade can be assigned to the documentation test category if the documentation includes the predetermined criteria or metrics in the benchmarks.

In some implementations, one or more of the assessment domains within the set of assessment domains relate to security measures of the pre-trained AI model. The corresponding set of tests can relate to data encryption in the pre-trained AI model, access controls of the pre-trained AI model, vulnerability management of the pre-trained AI model, threat detection of the pre-trained AI model, and/or remediation actions of the pre-trained AI model. For example, testing for data encryption can include testing the encryption methods used by the model and ensuring they comply with industry-standard cryptographic protocols (e.g., which can overlap with assessment domain(s) related to regulatory compliance.

To test for data encryption, the system can examine the AI model's code, the libraries the AI model utilizes, and the data transformations the AI model performs to identify any encryption mechanisms employed. By doing so, the system can verify whether the model uses approved ciphers and techniques, ensuring compliance with security standards. For example, the system obtains the keys necessary to decrypt any encrypted data within the model. Once the keys are secured, the system can proceed with decrypting the data and comparing it against the guidelines to ensure it was encrypted using approved ciphers and techniques. This involves checking the encryption algorithms, key lengths, and other cryptographic parameters against established security standards. The system can check if the functions and libraries of the AI model are recognized and approved for use according to the security guidelines. For example, if the model uses a third-party encryption library, the system can verify that this library is up-to-date and has not been flagged for security vulnerabilities. Additionally, the system can check that the implementation of encryption follows best practices, such as proper key management and secure handling of cryptographic operations. The system can also monitor the data flows within the AI model during runtime. This involves tracing the path of data as the data moves through the AI model, identifying points where data is encrypted or decrypted, and verifying that the operations comply with the security guidelines. For instance, the system checks whether sensitive data is encrypted before being stored or transmitted, and whether the data is properly decrypted when accessed for processing. By monitoring these data flows, the system can detect any deviations from the expected encryption practices and flag potential security issues.

Access control tests may involve examining user authentication procedures to ensure that only authorized individuals or systems can interact with the AI model and that access permissions are properly enforced to prevent unauthorized access or misuse. Vulnerability tests can identify potential vulnerabilities or weaknesses in the AI model's infrastructure, software components, or dependencies. Threat detection can involve evaluating the AI model's ability to detect and respond to various types of cybersecurity threats, including malware, intrusion attempts, and anomalous behavior. Threat detection tests can use techniques such as anomaly detection algorithms to identify potential security incidents. Remediation action tests can evaluate the AI model's capability to mitigate and address security incidents or breaches effectively. The assessment domain assesses the AI model's response procedures, incident management protocols, and resilience mechanisms. Examples of remediation actions include automated incident response, backup and recovery strategies, and incident reporting mechanisms to facilitate timely resolution of security incidents and minimal impact.

The system can, in some implementations, grade an AI model's detection of dependencies within the AI model's training data by evaluating how well the AI model identifies and manages relationships between different components, data sources, or processes the AI model relies on. For example, a higher grade can be awarded if the AI model has a higher accuracy in detecting dependencies within data. Additionally or alternatively, the system can grade an AI model's ability to handle dependency failures or conflicts. For example, if an external API used by the AI model becomes unavailable, a higher grade can be assigned to AI models that switch to a backup source or notify system administrators to address the issue (e.g., AI models that include actions to minimize disruption).

The system can, in some implementations, receive an indicator of a type of application associated with the pre-trained AI model. The system identifies a relevant set of assessment domains associated with the type of the application defining one or more operation boundaries of the pre-trained AI model, and obtains the relevant set of assessment domains, via an Application Programming Interface (API). The type of application can be, for example, the field in which the AI model is to be deployed (e.g., finance, healthcare). The system can test the same AI model using different assessment domains for different results based on the benchmarks of the particular field. For example, an AI model used in both the financial and healthcare fields can be graded through the grading engine twice under different assessment domains, and receive potentially different grades.

In act 908, for each assessment domains in the set of assessment domains, the system constructs a set of assessments (e.g., tests 804a-n in FIG. 8). For example, for prompt-based AI models, each assessment can include: (1) a prompt and (2) an expected response. The prompts provide inputs to the AI model under assessment and cause the AI model to generate a response that demonstrates its satisfaction (or lack thereof) with the guidelines. In some implementations, prompts represent real-world scenarios, along with an expected response. In some implementations, the prompt can specify the guidelines to be considered when generating the expected response. For example, when the prompt is a question related to whether a certain action complies with organizational regulations, the prompt indicates to the system to select/target guidelines defined by the organizational regulations. The prompt from the assessment operates as a command set, which operates as the input for the AI model. Once the command set/prompt is generated, the prompt is used as input for the AI model, which processes the commands and generates a response based on the AI model's internal decision-making processes. The expected response of each test can include an expected outcome and an expected explanation of how the expected outcome was determined. Each assessment evaluates (e.g., tests) the degree of satisfaction of the pre-trained AI model with one or more guidelines associated with the corresponding assessment domain. For example, to evaluate an AI model's compliance with regulatory guidelines, the prompt can be a simulated scenario that asks the AI model to generate an outcome (e.g., "Given XYZ, should this loan application be approved?").

The prompts can vary in complexity, ranging from simple queries to more complex scenarios designed to test various aspects of the model's performance. For example, if the guideline is to evaluate the model's ability to classify customer feedback accurately, a prompt can include a few sentences of feedback that need classification. The input data in this case would be the text of the feedback itself. The model's response is then compared against expected outcomes to determine if it meets the standards set by the guideline analysis. In another example where the prompt is more complex, the prompt can simulate a series of network activities and ask the AI model to identify potential security threats. This prompt requires the model to process various data points and make a comprehensive assessment. The input data includes logs of network activity, such as timestamps, IP addresses, and types of actions performed. When creating the prompt, the system can validate that the input data used in the prompts does not inadvertently introduce bias in the AI model's response. For example, if the model is being tested on its ability to make loan approval decisions, including a variable like the applicant's first name should not affect the outcome. If the results vary significantly based on names that suggest different genders or ethnic backgrounds, this could indicate a bias that needs to be addressed.

To prevent AI models from overfitting the assessments, in some implementations, the system generates a second set of assessments that include (1) a second prompt and (2) a second expected response, where the two sets of assessments are different, but both are calibrated to test the degree of satisfaction of the pre-trained AI model with the one or more guidelines associated with the corresponding assessment domain. For example, in an assessment domain assessing vulnerability management, different versions of the assessment could focus on varying aspects such as patch prioritization, exploit mitigation strategies, or incident response procedures. By varying the parameters, the system ensures that the AI model's performance is evaluated across a broader spectrum of scenarios, reducing the risk of overfitting to specific conditions. Additionally, the system can introduce randomness into the assessment inputs or scenarios presented to the AI model. The system can randomize factors such as input data samples, environmental conditions, and/or simulated attacks. To preserve computing resources, the system can rotate a preset series of assessments, and periodically update the set of assessments.

To ensure that multiple versions of assessments test the AI model consistently, each set of assessments can be determined using a predefined set of criteria and/or metrics for evaluation. To ensure that the variability introduced by different assessment sets does not lead to significant performance discrepancies, the system can compare a model's response to multiple sets of assessments and identify any significant deviations or inconsistencies. Adjustments can then be made to the sets of assessment prompts to align the assessment prompts with each other.

In some implementations, the set of assessments of a particular assessment domain constructed by the AI model is generated based on the complexity of the corresponding assessment. For example, subsequently constructed assessments can be progressively more complex than preceding assessments. Less complex assessments can provide an initial filter for the AI model for a particular assessment domain and can prevent unnecessary assessments. For example, if the AI model has no security measures at all, there is no need to further assess the AI model for the impact of specific security measures.

In some implementations, the set of assessments can include a set of initial seed prompts, but dynamically adjust subsequent prompts based on the AI model's performance. The system begins with a standardized set of seed prompts to establish a baseline performance. Depending on the AI model's responses to these initial prompts, the system then generates follow-up prompts tailored to address areas where the model showed strengths or weaknesses based on the degree of satisfaction. The adaptive evaluation method ensures a more thorough evaluation by focusing on specific aspects of the AI model's performance that require further examination. It allows for a more efficient assessment process by concentrating resources on the most relevant areas.

In act 910, the system evaluates the pre-trained AI model against the set of assessments to determine the degree of satisfaction of the pre-trained AI model with the set of guidelines for the corresponding assessment domain. The system supplies the prompt of the particular assessment into the pre-trained AI model. Responsive to inputting the prompt, the system receives, from the pre-trained AI model, a case-specific response. The system compares the expected response of the particular assessment to the case-specific response received from the pre-trained AI model.

To evaluate the AI application's response, the system can quantify a degree of similarity between 1) the expected response of the particular assessment and 2) the case-specific response received from the pre-trained AI model. In some implementations, the system can adjust the predefined threshold for similarity based on specific requirements and the complexity of the guidelines being evaluated. For instance, guidelines with stringent compliance requirements may warrant a higher similarity threshold to ensure a more rigorous assessment. The system can use semantic search techniques through natural language processing (NLP) algorithms to understand the meaning and context of the explanations and outcomes of the AI model and compare the response of the AI model with the expected response of the particular assessment. In some implementations, the textual data in the response of the AI model can be tokenized by word, phrase, and/or characters. For example, in the sentence "The quick brown fox jumped," the word tokens would be "The," "quick," "brown," "fox," and "jumped." In some implementations, the textual data in the response of the AI model can be broken down into vector representations of the alphanumeric characters. Once the textual data is vectorized, the system can extract the semantic meaning of each vector and understand the vector's context within the sentence and document. For example, word embedding models (e.g., Word2Vec, GloVe) can be used to capture the semantic relationships between words and phrases. The models can map words to high-dimensional vector representations, where similar words are closer together in vector space.

The semantic representations of the AI model's response are compared with the expected response specified in the particular assessment. The grading engine can align the vector representations of the tokens in the AI model's response with those of the expected response. The grading engine identifies similarities and differences between the two sets of vector representations, highlighting areas where the AI model's behavior diverges from the expected response specified in the particular assessment. Similarity metrics, such as cosine similarity or Jaccard similarity, can be used to quantify the similarity between the AI model's behavior and the expected responses. For example, cosine similarity can measure the cosine of the angle between two vector representations in vector space, whereas Jaccard similarity can measure the similarity between sets of tokens (e.g., the set of tokens of the response of the AI model, and the set of tokens of the expected response specified in the particular assessment) by comparing the intersection and union of the tokens within each set and quantify the degree of overlap or similarity between the sets based on their shared vocabulary. The similarity metrics provide numerical measures of how closely the AI model's behavior aligns with the expected response specified in the particular assessment, providing quantitative assessments of the degree of satisfaction.

In some implementations, such as when testing for AI explainability (discussed with reference to AI explainability 614e in FIG. 6), the system first compares the expected outcome of the particular assessment to the case-specific outcome received from the pre-trained AI model. Responsive to the expected outcome of the particular assessment satisfying the case-specific outcome received from the pre-trained AI model, the system can compare the expected explanation of the particular assessment to the corresponding case-specific explanation of the case-specific outcome. In some implementations, the metadata from the assessments are stored in a database so that the metadata from subsequent assessments can be compared with metadata from previous assessments.

The dimensions (e.g., assessment domain) an AI system is analyzed on are determined by the intended use (e.g., application domain) of the model. The assessment domains can be stored in structured or vector databases and versioned using similar methods to storing guidelines in a vector store with reference to FIG. 6. Versioning allows for comparisons between the results of previous assessments, as discussed further in act 902.

In some implementations, as the system analyzes a subset of functionality across a specific dimension (e.g., assessment domain), the system uses Variational Autoencoders (VAEs) to create analogous data sets from the original data. Using VAEs allows the system to observe how the model reacts to both familiar and slightly altered inputs, ensuring that the model meets the primary criteria of the dimension being tested. Running the varied data sets through the model not only improves the understanding of the model's behavior but also helps in identifying potential areas of improvement or unexpected biases, thereby refining its functionality and reliability. A VAE includes an encoder and a decoder. The encoder maps the input data (e.g., the original data used by the AI model) to a latent space, approximating the data distribution by outputting a mean and variance for each data point, thus defining a Gaussian distribution. The decoder then takes points from the latent space and maps them back to the original data space, allowing for the generation of new data points that resemble the input data. Data generated by VAEs for testing specific dimensions may also be stored using similar methods to storing guidelines in a vector store with reference to FIG. 6.

In some implementations, the system evaluates the AI model's capacity to follow instructions and generate outputs with specific qualities, and/or demonstrate a understanding of context and logical reasoning. For example, a model designed for customer service should not only provide accurate answers but also maintain a conversational tone, handle follow-up questions, and adapt to various customer needs. The system can evaluate these capabilities by testing the model in scenarios that mimic real-world interactions. For example, to test an AI model's ability to follow instructions, an AI model can be asked to generate a report based on specific information, such as real-world events and the system can evaluate the accurateness of the report received from the AI model. Additionally, the system can test an AI model's understanding by providing inputs that require nuanced responses (e.g., asking the AI model to offer tailored advice based on a particular financial situation and goals).

In act 912, using the evaluation, the system assigns a grade, for each assessment domain, to the pre-trained AI model in accordance with the set of benchmarks for the corresponding assessment domain. The assigned grade for each assessment domain can include a binary indicator of a presence of adherence of the pre-trained AI model with the set of guidelines for the corresponding assessment domain, a category indicating the corresponding assigned grade, and/or a probability indicating the corresponding assigned grade. The binary indicator can indicate whether the AI model meets the specified criteria (e.g., compliance with cybersecurity measures) or fails to do so (e.g., overall grade 704 in FIG. 7). A categorical grade reflects the overall performance of the AI model in meeting the criteria established for that particular category. For example, grades may be categorized as "Excellent," "Good," "Fair," or "Poor," based on the degree of satisfaction demonstrated by the AI model. A probability-based grade provides a quantitative measure of confidence in the assigned grade. The probability indicates the likelihood that the pre-trained AI model's performance aligns with the specified benchmarks for the assessment domain. In some implementations, rather than receiving a specific-type grade, the measurements taken from the assessment results are used as the grades themselves. In some implementations, in response to reaching a non-compliance threshold indicating an absence of adherence to the set of guidelines, the system can prevent assigning additional grades to preserve computing resources.

In act 914, using the assigned grades, the system maps the assigned grades for each assessment domain to a particular degree of satisfaction corresponding to one or more application domains of the pre-trained AI model. The system can weigh the assigned grades of each assessment domain within the set of assessment domains of the pre-trained AI model based on predetermined weights corresponding with each assessment domain. In some implementations, the generated set of application-domain-specific grades includes an overall score in accordance with the weighted grades of each assessment domain. The weights can change based on the type of AI application. For example, for a security AI model, cybersecurity-related assessment domains such as data encryption or vulnerability management may carry higher weights due to their higher importance in ensuring system security. In some implementations, the system generates confidence scores for each assigned grade. The confidence scores represent a reliability of the assigned grade.

In some implementations, the system receives a selected set of assessment domains within the set of assessment domains, and presents the set of application-domain-specific grades using a particular view scope. The particular view scope can filter the set of application-domain-specific grades using the selected set of assessment domains. For example, an AI model can be tested on a variety of general assessment domains, but in the context of cybersecurity, users may choose to only focus on assessment domains related to data encryption, access controls, vulnerability management, or threat detection. The users can then choose to only view the viewscope including the selected assessment domains. In some implementations, in addition to an overall score (e.g., overall grade 704 in FIG. 7), there can be additional application-domain-specific grades for each viewscope that encompasses multiple assessment domains (e.g., a grade for the "cybersecurity" view scope that includes assessment domains for data encryption, access controls, vulnerability management, and threat detection).

The system can use the generated set of application-domain-specific grades and generate a set of actions (e.g., a modification plan) that adjust the set of application-domain-specific grades to a desired set of application-domain-specific grades. The system can identify the root cause of the difference between the set of application-domain-specific grades and the desired set of application-domain-specific grades. For example, the desired set of application-domain-specific grades can be higher than the actual application-domain-specific grade received. The system then parses through the grades received for each assessment domain and identifies potential discrepancies to map to corrective actions. If the data quality grade was significantly lower than other assessment domain grades, for example, a corrective action can include further pre-processing of training data. The corrective actions can be preloaded into the system.

In act 916, the system generates and/or presents a representation indicating application-domain-specific grades, where the representation includes each application domain of the pre-trained AI model and the corresponding application-domain-specific grades. A representation can include a graphical layout in a graphical user interface (GUI), a textual representation, a programmatic representation, an audio representation, among others.

The degree of satisfaction is represented, in some implementations, in simplified terms, using grades, so that less technical individuals can easily understand and make informed decisions with regards to the AI model. In addition, the degree of satisfaction can be reported in detailed ways, such as presenting approximations of the model's biases, weights, and activation functions, as well as the variables used in the analysis and their impacts (causality). The detailed reporting provides the information for individuals such as model creators and tuners to make adjustments, ensuring that the model's results align with the desired outputs.

The graphical layout can include visual elements such as charts, graphs, and tables to indicate the application-domain-specific grades for a particular application domain. For example, the GUI can include interactive elements such as drop-down menus, sliders, and clickable icons that allow users to filter and sort the displayed information. Users can, in some implementations, select specific domains, adjust the time frame for performance data, and view breakdowns of individual grades. The programmatic representation can include data structures, APIs, serialized formats (e.g., JSON, XML), among others, that allow other software systems to access and process the application-domain-specific grades and/or the corresponding application domains. The textual representation can include descriptions of the grading criteria, the AI model's performance in each domain, and/or textual explanations of the mapped application-domain-specific grades for the corresponding application domains. An audio representation can include audio elements presented through a microphone of a device that audibly communicates the mapped application-domain-specific grades for the corresponding application domains.

In some implementations, the system can detect whether an AI model's data is periodically evaluated against relevant regulations or guidelines to ensure data quality, and whether the AI model can detect a need to update or retire portions of the AI model's training data. For example, if an AI model consistently shows a decline in performance when benchmarked against new regulations and/or guidelines, this may indicate that the training data is outdated. In the context of threat detection, a model's declining detection rates or increased false negative rates compared to the benchmarks can signal that the data used to train and validate the model no longer adequately represents the current threat environment. In such cases, the outdated data can be updated with more recent and relevant data to improve the model's accuracy and effectiveness.

In some implementations, based on the legal and regulatory requirements extracted from the guidelines, the system grades the AI model on whether the AI model can, in response to regulatory obligations obtained from the guidelines (e.g., regulatory reporting), automatically notify users of the AI model or execute automatic compliance actions. For example, in a financial context, the system can test the AI model on whether the AI model can automatically gather the appropriate data and generate the reports required by regulatory bodies.

Similarly, in some implementations, the system can test the AI model on whether the AI model triggers alerts after detecting the inclusion of parameters that do not comply with regulatory guidelines, so that the AI model can be adjusted before the AI model is deployed. For example, a benchmark can assess the AI model's ability to identify and flag instances where data is being transferred to a server located in a different country, which can have additional regulatory implications and can trigger additional assessments. If a developer attempts to commit code that involves cross-border data transfer without proper encryption or legal authorization, the AI model can trigger an alert and prevent the commit.

In some implementations, different versions of guidelines may include changes that impact how an AI model is evaluated. For example, newer privacy regulations can introduce stricter data handling and user consent requirements, so a model that previously passed data encryption checks might now fail the stricter encryption standards. The system can indicate the differences in the levels of satisfaction and/or the benchmarks used to evaluate the AI model between new and previous guidelines to highlight any differences between the guidelines.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method for grading a pre-trained Artificial Intelligence (AI) model via a graphical user interface (GUI), the method comprising:
   obtaining a set of application domains of the pre-trained AI model in which a pre-trained AI model will be used, wherein the pre-trained AI model is configured to generate, in response to a received input, a response;
   using the set of application domains, determining a set of guidelines defining one or more operation boundaries of the pre-trained AI model by mapping each application domain of the set of application domains to one or more guidelines of the set of guidelines;
   generating a set of test categories associated with the one or more guidelines of the set of guidelines,
      wherein each of the set of test categories includes a set of benchmarks,
      wherein each benchmark in the set of benchmarks is configured to indicate a degree of satisfaction of the pre-trained AI model with the one or more guidelines associated with a corresponding test category
      wherein the set of test categories include at least two of: quality of training data of the pre-trained AI model, security measures of the pre-trained AI model, software development practices of the pre-trained AI model, satisfaction with regulations of the pre-trained AI model, and explainability of the response of the pre-trained AI model;
   for each test categories in the set of test categories, constructing a set of tests,
      wherein each test comprises: (1) a prompt and (2) an expected response,
      wherein each test is configured to test the degree of satisfaction of the pre-trained AI model with the one or more guidelines associated with the corresponding test category;
   for each test of the sets of tests, obtaining, from the pre-trained AI model, a set of case-specific responses by:
      transmitting the prompt of the test into one or more nodes of an input layer of the pre-trained AI model, wherein the one or more nodes are associated with the corresponding test category, and
      responsive to transmitting the prompt, receiving, from an output layer of the pre-trained AI model, a case-specific response;
   using the obtained sets of case-specific responses, assigning a grade, for each test category, to the pre-trained AI model in accordance with the set of benchmarks for the corresponding test category by, for each test:

comparing the expected response of the test to the case-specific response received from the pre-trained AI model;

using the assigned grades, mapping the assigned grades for each test category to a particular degree of satisfaction corresponding to one or more application domains of the pre-trained AI model; and generating for display at the GUI, a graphical layout indicating application-domain-specific grades, wherein the graphical layout includes a first graphical representation of each application domain of the pre-trained AI model and a second graphical representation of corresponding application-domain-specific grades.

2. The method of claim 1, wherein the set of tests is a first set of tests, wherein the prompt is a first prompt, wherein the expected response is a first expected response, the method further comprising:

generating, for each of the test categories in the set of test categories, a second set of tests,
wherein each test in the second set of tests comprises: (1) a second prompt and (2) a second expected response,
wherein the second prompt is different from the first prompt,
wherein the second expected response is different from the first expected response, and
wherein each test in the second set of tests is configured to test the degree of satisfaction of the pre-trained AI model with the one or more guidelines associated with the corresponding test category.

3. The method of claim 1, further comprising:
determining the set of guidelines, via a machine learning (ML) model, using one or more of:
a location of the pre-trained AI model,
a use case of the pre-trained AI model, or
data sources used in the pre-trained AI model.

4. The method of claim 1,
wherein one or more of the test categories within the set of test categories relates to the quality of training data of the pre-trained AI model, and
wherein a corresponding set of tests relates to one or more of:
a presence of bias within the training data,
a presence of structured metadata in the training data, or
a presence of outliers in the training data.

5. The method of claim 1, wherein the set of guidelines include one or more of: governmental regulations of a specific jurisdiction, organization-specific regulations, or AI application type-specific guidelines.

6. The method of claim 1,
wherein one or more of the test categories within the set of test categories relates to the security measures of the pre-trained AI model, and
wherein corresponding set of tests relates to one or more of:
data encryption in the pre-trained AI model,
access controls of the pre-trained AI model,
vulnerability management of the pre-trained AI model,
threat detection of the pre-trained AI model, or
remediation actions of the pre-trained AI model.

7. The method of claim 1,
wherein the case-specific response of the pre-trained AI model includes a case-specific outcome and a case-specific explanation of how the case-specific outcome was determined, wherein the expected response of each test includes an expected outcome and an expected explanation of how the expected outcome was determined, and wherein comparing the expected response of a particular test to the case-specific response received from the pre-trained AI model includes:
comparing the expected outcome of the particular test to the case-specific outcome received from the pre-trained AI model, and
responsive to the expected outcome of the particular test satisfying the case-specific outcome received from the pre-trained AI model, comparing the expected explanation of the particular test to a corresponding case-specific explanation of the case-specific outcome.

8. A non-transitory, computer-readable storage medium storing instructions for grading a pre-trained Artificial Intelligence (AI) model, wherein the instructions when executed by at least one data processor of a system, cause the system to:

obtain a set of application domains of the pre-trained AI model in which a pre-trained AI model will be used,
wherein the pre-trained AI model is configured to generate, in response to a received input, a response;

using the set of application domains, determine a set of guidelines defining one or more operation boundaries of the pre-trained AI model by mapping each application domain of the set of application domains to one or more guidelines of the set of guidelines;

accessing a set of assessment domains associated with the one or more guidelines of the set of guidelines,
wherein each of the set of assessment domains includes a set of benchmarks,
wherein each benchmark in the set of benchmarks is configured to indicate a degree of satisfaction of the pre-trained AI model with the one or more guidelines associated with corresponding assessment domains;

for each assessment domains in the set of assessment domains, construct a set of assessments,
wherein each assessment is configured to test the degree of satisfaction of the pre-trained AI model with the one or more guidelines associated with a corresponding assessment domain;

evaluate the pre-trained AI model against the set of assessments to determine the degree of satisfaction of the pre-trained AI model with the set of guidelines for the corresponding assessment domain by transmitting a command indicating one or more assessments into an input layer of the AI model;

using the evaluation, assign a grade, for each assessment domain, to the pre-trained AI model in accordance with the set of benchmarks for the corresponding assessment domain by;

using the assigned grades, map the assigned grades for each assessment domain to a particular degree of satisfaction corresponding to one or more application domains of the pre-trained AI model; and generate a representation indicating application-domain-specific grades, wherein the representation includes each application domain of the pre-trained AI model and corresponding application-domain-specific grades.

9. The computer-readable storage medium of claim 8, wherein one or more of the assigned grades for each assessment domain includes one or more of:
a binary indicator of a presence of adherence of the pre-trained AI model with the set of guidelines for the corresponding assessment domain, a category indicating a corresponding assigned grade, or a probability indicating the corresponding assigned grade.

10. The computer-readable storage medium of claim 8, wherein the instructions further cause the system to:
receive a subset of application domains within the set of application domains; and
present a subset of the application-domain-specific grades using a particular view scope,
wherein the particular view scope filters the set of application-domain-specific grades using the subset of application domains.

11. The computer-readable storage medium of claim 8, wherein the instructions further cause the system to:
receive an indicator of a type of application associated with the pre-trained AI model;
identify a relevant set of assessment domains associated with the type of the application defining the one or more operation boundaries of the pre-trained AI model; and
obtain the relevant set of assessment domains, via an Application Programming Interface (API).

12. The computer-readable storage medium of claim 8, wherein the set of assessments of a particular assessment domain constructed by the pre-trained AI model includes a set of seed assessments,
wherein subsequently assessments of the set of assessments constructed subsequent to the set of seed assessments are dynamically generated using the degree of satisfaction of the pre-trained AI model with the one or more guidelines associated with the set of seed assessments.

13. The computer-readable storage medium of claim 8, wherein the instructions further cause the system to:
using the set of application-domain-specific grades, generate a set of actions configured to adjust the set of application-domain-specific grades to a desired set of application-domain-specific grades.

14. The non-transitory, computer-readable storage medium of claim 8, wherein the instructions further cause the system to:
obtain a new set of guidelines;
identify one or more new assessment domains associated with the new set of guidelines; and
iteratively update the set of assessment domains by adding the one or more new assessment domains to the set of assessment domains.

15. A system for grading an Artificial Intelligence (AI) model, comprising:
at least one processor; and
one or more non-transitory computer-readable media storing instructions, which when executed by at least one processor, perform operations comprising:
obtaining a set of application domains of the AI model in which an AI model will be used,
wherein the AI model is configured to generate, in response to a received input, a response;
using the set of application domains, determining a set of guidelines defining one or more operation boundaries of the AI model by mapping each application domain of the set of application domains to one or more guidelines of the set of guidelines;
accessing a set of assessment domains associated with the one or more guidelines of the set of guidelines, wherein each of the set of assessment domains includes a set of benchmarks,
wherein each benchmark in the set of benchmarks is configured to indicate a degree of satisfaction of the AI model with the one or more guidelines associated with corresponding assessment domains;
for each assessment domains in the set of assessment domains, constructing a set of assessments,
wherein each assessment is configured to test the degree of satisfaction of the AI model with the one or more guidelines associated with a corresponding assessment domain;
evaluating the AI model against the set of assessments to determine the degree of satisfaction of the AI model with the set of guidelines for the corresponding assessment domain;
using the evaluation, assigning a grade, for each assessment domain, to the AI model in accordance with the set of benchmarks for the corresponding assessment domain by;
using the assigned grades, mapping the assigned grades for each assessment domain to a particular degree of satisfaction corresponding to one or more application domains of the AI model;
generating a representation indicating application-domain-specific grades, wherein the representation includes each application domain of the AI model and corresponding application-domain-specific grades; and
using the application-domain-specific grades, automatically generating a set of actions to adjust one or more parameters of the AI model to increase a degree of satisfaction of the AI model with corresponding operative boundaries of one or more application domains.

16. The system of claim 15, the operations further comprising:
weighing the assigned grades of each assessment domain within the set of assessment domains of the AI model based on predetermined weights corresponding with each assessment domains,
wherein the set of application-domain-specific grades includes an overall score in accordance with the weighted application-domain-specific grades of each assessment domains.

17. The system of claim 15, the operations further comprising:
generating confidence scores for each assigned grade,
wherein the confidence scores are configured to represent a reliability of the assigned grade.

18. The system of claim 15, wherein evaluating the AI model against the set of assessments further causes the system to:
in response to reaching a non-compliance threshold indicating a low level of satisfaction of the AI model with the set of guidelines, prevent assigning additional grades to the assessment domains.

19. The system of claim 15, wherein the application-domain-specific grades is a first set of application-domain-specific grades, the operations further comprising:
receiving an updated set of benchmarks for one or more of the set of assessment domains;
using the updated set of benchmarks, generating a second set of application-domain-specific grades of the AI model; and
responsive to the second set of application-domain-specific grades indicating a lower degree of satisfaction than the first set of application-domain-specific grades, updating a training data that the AI model is trained on to increase the degree of satisfaction of the AI model with the updated set of benchmarks.

20. The system of claim 15, wherein the set of actions is a set of programmatic workflows, the operations further comprising:
executing the set of actions to generate a document configured to satisfy the one or more operation boundaries of the AI model.

* * * * *